US012564269B2

(12) United States Patent
Hart

(10) Patent No.: US 12,564,269 B2
(45) Date of Patent: Mar. 3, 2026

(54) BED RAIL ASSEMBLY

(71) Applicant: ANDREW J HART ENTERPRISES LIMITED, Woodbridge (CA)

(72) Inventor: Andrew J Hart, Woodbridge (CA)

(73) Assignee: ANDREW J HART ENTERPRISES LIMITED, Woodbridge (CA)

( * ) Notice: Subject to any disclaimer, the term of this patent is extended or adjusted under 35 U.S.C. 154(b) by 229 days.

(21) Appl. No.: 18/304,532

(22) Filed: Apr. 21, 2023

(65) Prior Publication Data

US 2024/0349899 A1 Oct. 24, 2024

(51) Int. Cl.
*A47C 19/02* (2006.01)
*A61G 7/053* (2006.01)

(52) U.S. Cl.
CPC .............. *A47C 19/02* (2013.01); *A61G 7/053* (2013.01)

(58) Field of Classification Search
CPC ........ A47C 19/02; A47C 21/08; A61G 7/053; A61G 7/0507; A61G 7/0518
See application file for complete search history.

(56) References Cited

U.S. PATENT DOCUMENTS

| | | | | |
|---|---|---|---|---|
| 6,289,539 | B1 * | 9/2001 | Alpern | A61G 7/0507 5/81.1 R |
| 6,557,188 | B1 * | 5/2003 | Peterson | A61G 7/053 5/81.1 R |
| 7,103,928 | B1 * | 9/2006 | Childs | A61G 7/0518 5/426 |
| 7,181,788 | B2 * | 2/2007 | Flannery | A61G 7/0507 5/426 |
| 7,373,679 | B2 * | 5/2008 | Miller | A61G 7/0518 5/426 |
| 10,827,849 | B1 | 11/2020 | Flannery et al. | |
| 11,458,053 | B1 | 10/2022 | Flannery et al. | |
| 2004/0168251 | A1 * | 9/2004 | Waldman | A47C 21/08 5/426 |
| 2004/0250347 | A1 * | 12/2004 | Brewin | A61G 7/051 5/426 |
| 2005/0262632 | A1 * | 12/2005 | Wu | A61G 7/0507 5/426 |
| 2007/0089242 | A1 * | 4/2007 | Battiston | A47C 21/08 5/425 |
| 2011/0179569 | A1 * | 7/2011 | Hayano | A47D 15/008 5/426 |

* cited by examiner

*Primary Examiner* — Fredrick C Conley
(74) *Attorney, Agent, or Firm* — SMART & BIGGAR LP

(57) ABSTRACT

A method of providing a portable bed rail for a user include the steps of: (a) positioning a user support member of a bed rail assembly on a first longitudinally extending side of a mattress, the user support member comprising a hand grip portion; (b) positioning a mattress securing member on an opposed second longitudinally extending side of the mattress, the mattress securing member having a lower end and an upper end; and, (c) securing the user support member a fixed distance from the mattress securing member wherein the user support member is adjacent the first longitudinally extending side of the mattress and the mattress securing member is adjacent the second longitudinally extending side of the mattress.

9 Claims, 18 Drawing Sheets

PRIOR ART

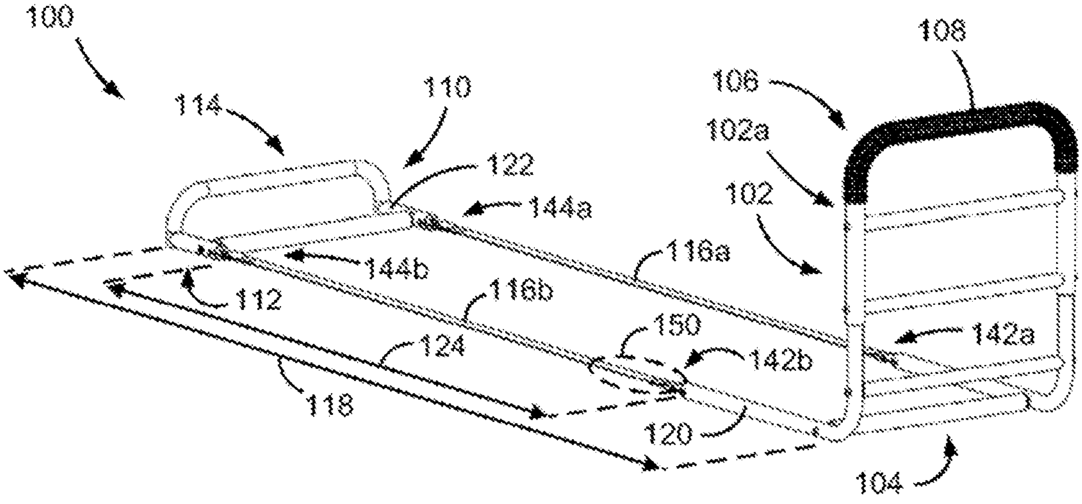
FIG. 6A
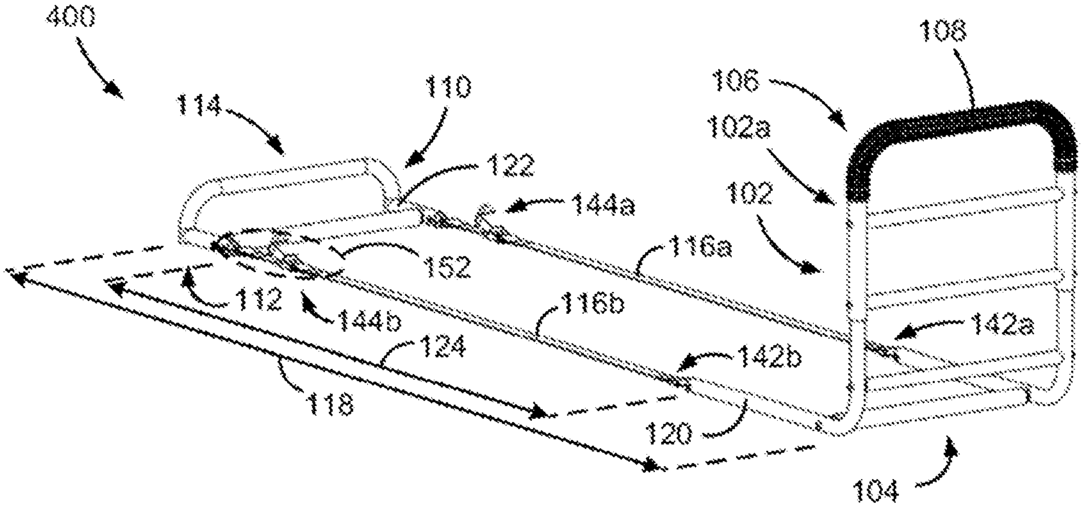
FIG. 6B
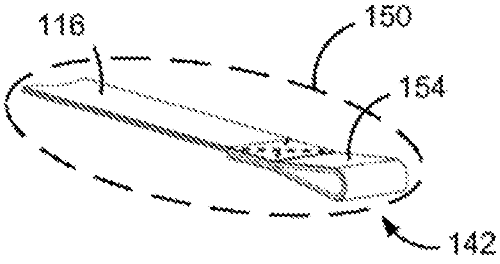
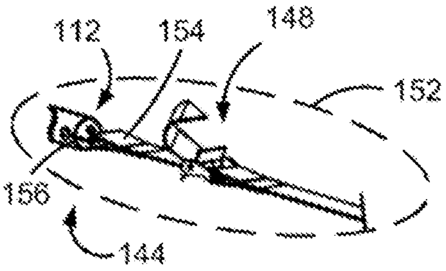
FIG. 6C
FIG. 6D

BED RAIL ASSEMBLY

FIELD

This disclosure relates generally to bed rail assemblies.

INTRODUCTION

The following is not an admission that anything discussed below is part of the prior art or part of the common general knowledge of a person skilled in the art.

Bed rail assemblies are generally sold for use in a personal residence and in long-term care homes to users requiring assistance getting into and out of a bed, repositioning within the bed, and for support when positioned beside the bed, such as for assistance in dressing or transferring to a wheelchair, for example. Bed rail assemblies allow users with mobility issues to maintain a degree of independence, and thus maintain the user's quality of life.

Existing bed rails are responsible for deaths resultant from various regions associated with the bed rail or the bedrail and mattress, known as entrapment zones, in which a user or body part thereof may become trapped. Referring to FIG. 1 showing an example bed rail 1000 in the art, a lower leg 1005 of a generally L-shaped bed rail 1010 is positioned between a mattress 1015 and a box spring 1020 and/or bed base 1025. The weight of the mattress 1015 on the lower leg 1005 of the bed rail 1010 is intended to prevent overturn of the bed rail 1010, such as when a user pushes or pulls on an upper leg 1030 of the bedrail 1010 for support or to assist in moving. However, as exemplified in FIG. 1, the bed rail 1010 is permitted to move independently from the mattress 1015 and may thus become separated from the upper leg 1030 of the bed rail 1010, creating an entrapment gap 1035 therebetween.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with an aspect of this disclosure, a kit for a bed rail assembly is provided that comprises a user support member and a mattress securing member that are secured together. When installed, the user support member extends above the upper surface of the mattress and provides a hand rail or hand grip portion which may, for example, be used by a person to assist them in repositioning themselves in the bed or to assist them in getting into or out of the bed. The user support member may be one or more of a bed rail (a rail portion) and a support pole. When installed, the mattress securing member is provided on an opposite side of the bed from the user support member, and may have a height that is shorter than the mattress thickness. Accordingly, when installed, the upper end of the mattress securing member may be located below the upper surface of the mattress. When installed, the user support member and the mattress securing member are secured together such that the user support member and the mattress securing member are positioned a maximum distance apart, i.e. the user support member may not move substantially or at all away from the mattress securing member. Accordingly, the mattress may be sandwiched between the user support member and the mattress securing member and the distance between the user support member and the mattress securing member may be the same as or slightly less than the width of the mattress. Accordingly, the user support member and the mattress securing member may be maintained in position with respect to the mattress by frictional engagement of the user support member and the mattress securing member abutting opposed sides of the mattress. Optionally, the bed rail assembly, e.g., the connecting member, may be secured to the bed frame (a bed base and/or box spring).

In accordance with this aspect of this disclosure, which may be used alone or in combination with any one or more other aspects, a kit for a bed rail assembly includes:

(a) a user support member having a hand grip portion;

(b) a mattress securing member having a lower end and an upper end; and, (c) a first connecting member comprising a longitudinally extending member which has a length that is at least as long as a width of a mattress and is operable to secure the mattress securing member a first fixed distance from the user support member, wherein, when the kit is assembled and provided on a bed frame, the first connecting member extends between the user support member and the lower end of the mattress securing member, and wherein, when the kit is assembled and provided on the bed frame, the first connecting member secures the mattress securing member spaced the first fixed distance from the user support member and facing the user support member with the upper end of the mattress securing member above the lower end of the mattress securing member.

In any embodiment, the first connecting member may also be operable to secure at least one of the user support member and the mattress securing member to the bed frame. The length of the connecting member may be adjustable.

In any embodiment, the kit may further include a locking member. The mattress securing member may be securable at a plurality of fixed distances from the user support member. The plurality of fixed distances may correspond to standard widths of mattresses.

In any embodiment, the first connecting member may be a telescopically adjustable member that is securable in a plurality of positions. Each position may define a different length of the first connecting member whereby the mattress securing member may be securable at a plurality of fixed distances from the user support member.

In any embodiment, the first connecting member may include a flexible member, and the length of the connecting member may be adjustable.

In any embodiment, the flexible member may have a length sufficient to extend around the bed frame whereby, when the kit is assembled and provided on the bed frame, the mattress securing member may be secured the first fixed distance from the user support member and the user support member and the mattress securing member may be secured to the bed frame.

In any embodiment, the user support member may include a rail portion having a lower portion and an upper portion. The upper portion may include the hand grip portion. The rail portion may have a rail portion height from the lower end of the rail portion to the upper end of the rail portion. The rail portion height may be adjustable. The hand grip portion may be securable in a plurality of positions with respect the lower portion of the rail portion.

In any embodiment, the mattress securing member may have a mattress securing member height from the lower end of the mattress securing member to the upper end of the mattress securing member. The mattress securing member height may be adjustable. The upper end of the mattress securing member may be securable in a plurality of positions with respect the lower end of the mattress securing member.

In any embodiment, the user support member may include a support pole.

In any embodiment, the user support member may include a rail portion having a lower portion and an upper portion. The upper portion may include the hand grip portion. The kit may further include a second connecting member wherein each of the rail portion and the mattress securing member may have first and second longitudinally spaced apart ends. The first connecting member secures the first end of the mattress securing member the first fixed distance from the first end of the rail portion. The second connecting member secures the second end of the mattress securing member the first fixed distance from the second end of the rail portion.

In accordance with another aspect of this disclosure, which may be used alone or in combination with any one or more other aspects, a method of providing a portable bed rail for a user includes the steps of:

(a) positioning a user support member of a bed rail assembly on a first longitudinally extending side of a mattress, the user support member comprising a hand grip portion;

(b) positioning a mattress securing member on an opposed second longitudinally extending side of the mattress, the mattress securing member having a lower end and an upper end; and, (c) securing the user support member a fixed distance from the mattress securing member wherein the user support member is adjacent the first longitudinally extending side of the mattress and the mattress securing member is adjacent the second longitudinally extending side of the mattress.

In any embodiment, step (c) may include positioning a connecting member having a fixed length underneath the mattress and using the connecting member to secure the user support member the fixed distance from the mattress securing member whereby each of the user support member and the mattress securing member abut an opposed side of the mattress.

In any embodiment, using the connecting member to secure the user support member the fixed distance from the mattress securing member may include securing the connecting member to the lower end of the mattress securing member and a portion of the user support member located below an upper end of the mattress.

In any embodiment, step (c) may include positioning a connecting member underneath the mattress. The connecting member may include a telescopically adjustable member. Step (c) may further include using the connecting member to secure the user support member the fixed distance from the mattress securing member.

In any embodiment, the user support member may include a rail portion having a lower portion and an upper portion. The upper portion may include the hand grip portion. Using the connecting member to secure the user support member the fixed distance from the mattress securing member may include securing the connecting member to each the lower end of each of the rail portion and the mattress securing member.

In any embodiment, the user support member may include a rail portion having a lower portion and an upper portion. The upper portion may include the hand grip portion. Each of the rail portion and the mattress securing member may have first and second longitudinally spaced apart ends. Step (c) may include positioning a first connecting member underneath the mattress and using the first connecting member to secure the first end of the rail portion the fixed distance from the first end of the mattress securing member and positioning a second connecting member underneath the mattress and using the second connecting member to secure the second end of the rail portion the fixed distance from the second end of the mattress securing member.

In any embodiment, the method may further include securing the portable bed rail to a bed frame on which the mattress is positioned.

In any embodiment, the first connecting member may be mechanically affixed to the bed frame.

In any embodiment, the first connecting member may be a flexible member that may be wrapped around the bed frame.

In any embodiment, the bed rail assembly may include a second connecting member and the second connecting member may secure a portion of the bed rail assembly to the bed frame.

In any embodiment, the user support member may include a support pole. The method may further include securing the support pole in position adjacent a side of the bed frame.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 6A is a perspective view of another example bed rail assembly wherein the bed rail assembly has two flexible connecting members, and wherein the user support member is a rail portion;

FIG. 6B is a perspective view of another example bed rail assembly wherein the bed rail assembly has two adjustable flexible connecting members, and wherein the user support member is a rail portion;

FIG. 6C is an enlarged view of a first portion of the bed rail assembly of FIG. 6A;

FIG. 6D is an enlarged view of a second portion of the bed rail assembly of FIG. 6B;

Figure 1:
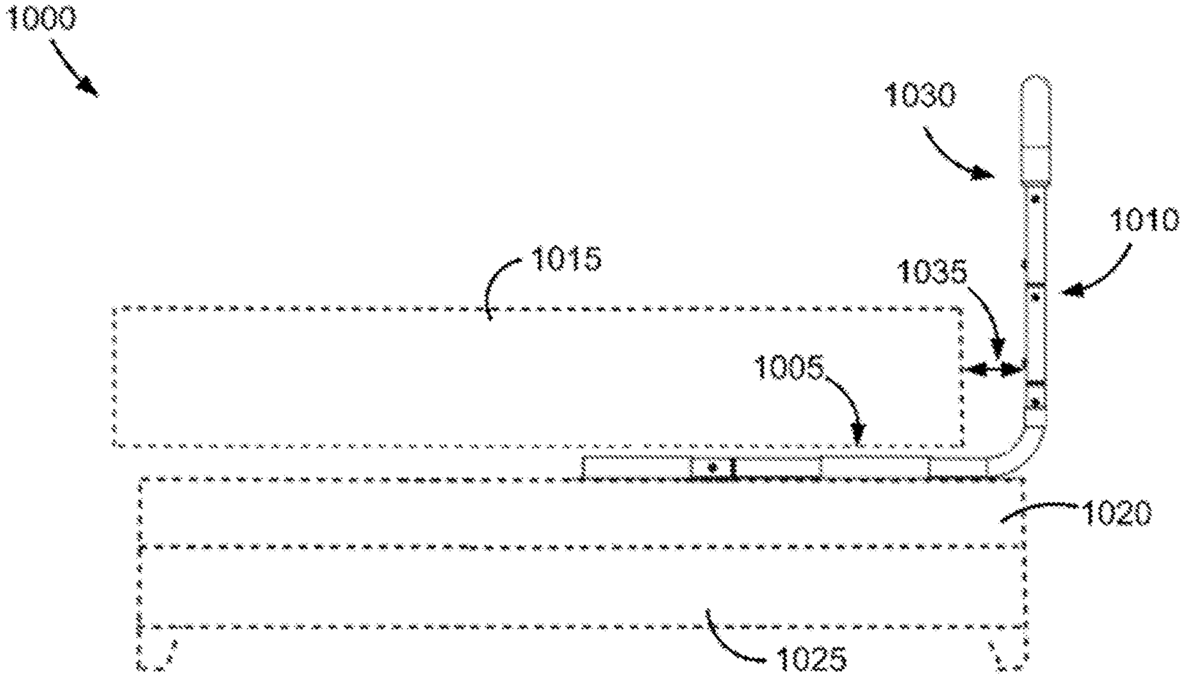
FIG. 1 is a side view of a typical bed rail in the art.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms “an embodiment,” “embodiment,” “embodiments,” “the embodiment,” “the embodiments,” “one or more embodiments,” “some embodiments,” and “one embodiment” mean “one or more (but not all) embodiments of the present invention(s),” unless expressly specified otherwise.

The terms “including,” “comprising” and variations thereof mean “including but not limited to,” unless expressly specified otherwise. A listing of items does not imply that any or all of the items are mutually exclusive, unless expressly specified otherwise. The terms “a,” “an” and “the” mean “one or more,” unless expressly specified otherwise.

As used herein and in the claims, two or more parts are said to be “coupled”, “connected”, “attached”, or “fastened” where the parts are joined or operate together either directly or indirectly (i.e., through one or more intermediate parts), so long as a link occurs. As used herein and in the claims, two or more parts are said to be “directly coupled”, “directly connected”, “directly attached”, or “directly fastened” where the parts are connected in physical contact with each other. None of the terms “coupled”, “connected”, “attached”, and “fastened” distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

General Description of a Bed Rail Assembly

Figure 2A:
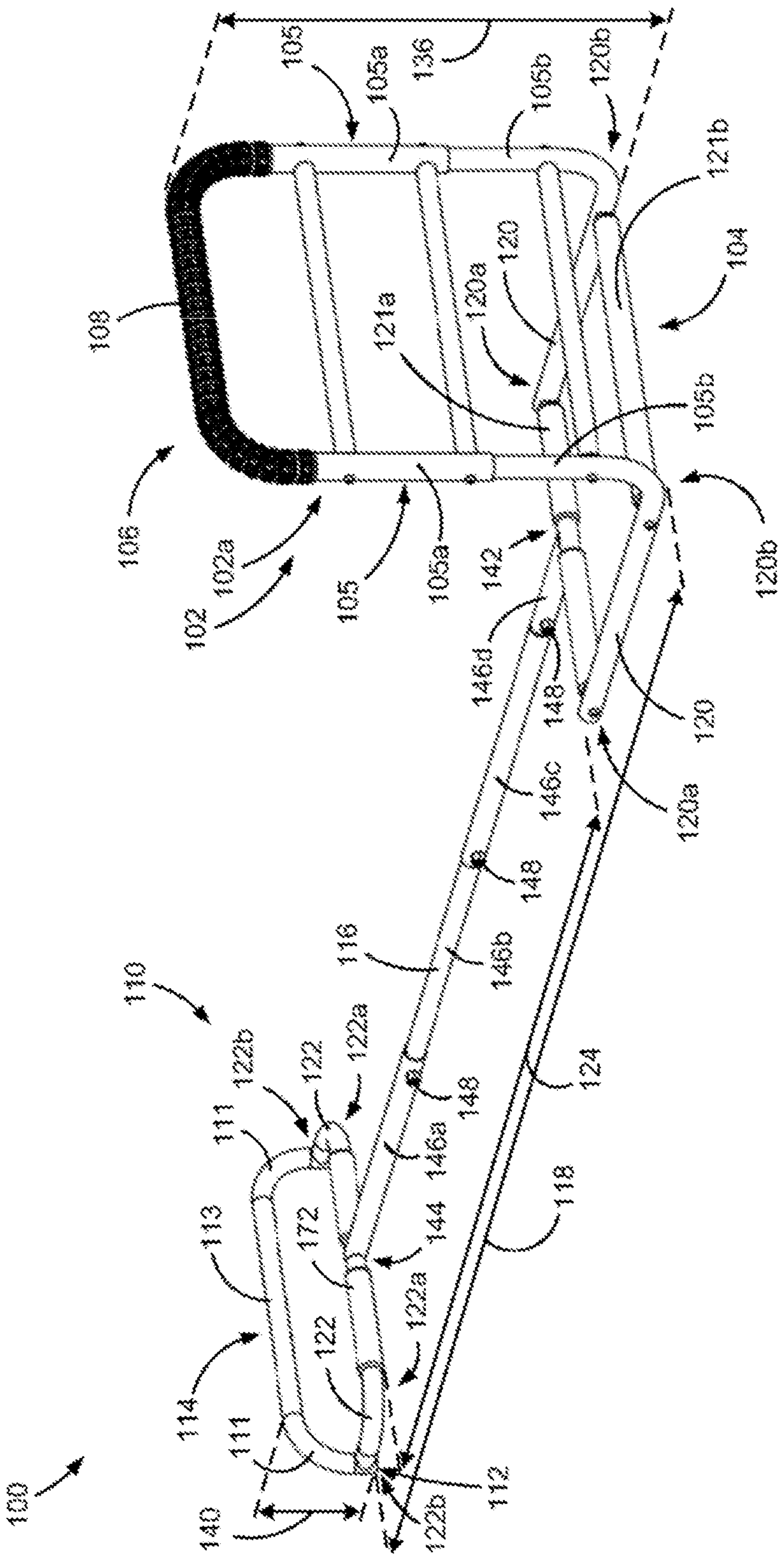
FIG. 2A is a perspective view of an example bed rail assembly having one connecting member, wherein the user support member is a rail portion.

Referring to FIG. 2A, an exemplary embodiment of a bed rail assembly is shown generally as 100. The bed rail assembly 100 includes a user support member 102, a mattress securing member 110 and a first connecting member 116.

The user support member 102 shown in FIG. 2A is a rail portion 102*a*. The rail portion 102*a* has a lower end 104, an upper end 106 and vertical members 105 extending therebetween. The upper end 106 includes a hand grip portion 108. The hand grip portion 108 may be of any configuration known in the bed rail art. Optionally, the hand grip portion 108 provided is a grip member. The grip member may be an overlay that is provided on part or all of the hand grip portion and may be made of a non-slip member, such as rubber or a rubberized material.

The lower end 104 is configured to be positioned underneath a mattress and may be of any design known in the bed rail art. As exemplified, the lower end 104 includes first and second lower members 120 that extend generally perpendicularly inwardly from a lower end of the vertical members 105. Accordingly, the lower end 104 may be generally L-shaped and configured to be positionable under a mattress. It will be appreciated that the lower members 120 may be of various lengths and may have a length so that, when installed, they extend 6", 12", 18", 24" or more under a mattress whereby the hand grip portion 108 is relatively stable when used by a person to assist in getting into or out of the bed. Optionally, the inner 120*b* and/or outer 120*a* ends of lower members 120 may be secured together to prevent lateral motion of the lower members. As exemplified, an outer cross strut 121*b* is provided at the outer ends 120*b* of the lower members 120 and an inner cross strut 121*a* is provided at the inner ends 120*a* of the lower members 120.

Figure 2B:
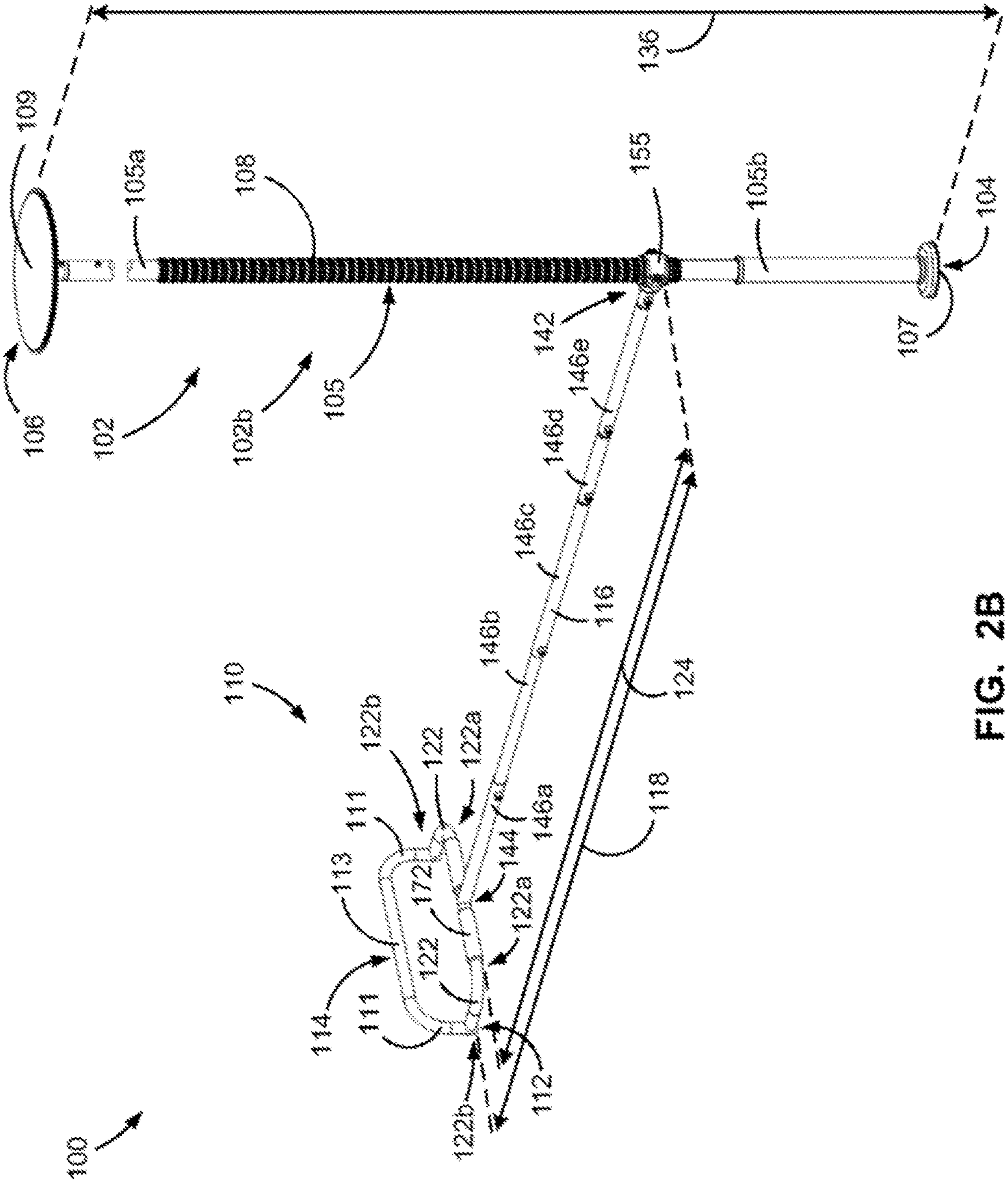
FIG. 2B is a perspective view of another example bed rail assembly having one connecting member, wherein the user support member is a support pole.

Referring to FIG. 2B, another exemplary embodiment of the bed rail assembly 100 is shown. It will be appreciated that the bed rail assembly of FIG. 2B differs from the bed rail assembly of FIG. 2A primarily in that the user support member 102 shown in FIG. 2B is a support pole 102*b*. Accordingly, the mattress securing member 110 and the first connecting member 116 that is used with the support pole 102*b* may be the same as the ones used with the rail portion 201*a*.

The support pole 102*b* has a lower end 104, an upper end 106 and a vertical member 105 extending therebetween. The vertical member 105 optionally includes a hand grip portion 108 that may include a grip member as described with respect to FIG. 2A. The lower end 104 and the upper end 106 are configured to engage the floor and ceiling, respectively. As exemplified, the lower end 104 of the support pole 102*b* includes a pole base 107 having a flat surface for engaging the floor. The upper end 106 of the support pole 102*b* includes a pole top 109 having a flat surface for engaging the ceiling.

The pole base 107 and the pole top 109 are shown as circular, but any other shape may be possible. The pole base 107 and the pole top 109 may be dimensioned, such as having a diameter of sufficient length, to prevent overturn of the support pole 102*b* through disengagement of the pole base 107 and/or the pole top 109 from the floor and/or ceiling when force is applied to the hand grip portion 108 of the support pole 102*b* by a user. It will be appreciated that, optionally, the pole base 107 and/the pole top 109 may be secured to the floor and/or ceiling of a room.

The vertical member 105 of the support pole 102*b* may further be adjustable in length. During installation, the support pole 102*b* may be positioned with the pole base 107 on and engaging the floor, and the pole top 109 proximate the ceiling. The vertical member 105 may be extended until the pole top 109 is in engagement with the ceiling, and the vertical member 105 may further be over-extended such that the support pole 102*b* is under a compressive load between the floor and the ceiling. This may strengthen securement of the support pole 102*b* between the floor and the ceiling.

The pole base 107 and/or the pole top 109 may optionally include a compressible member, such as rubber, that may be compressed between the floor and the lower end 104 or the ceiling and the upper end 106, respectively. The compressible member may further strengthen compressive securement of the support pole 102*b* between the floor and the ceiling. The compressible member may also provide additional frictional securement with the floor and/or ceiling along the plane of the floor and/or ceiling. This may resist shifting of the support pole 102*b* once positioned and may help prevent overturn of the support pole 102*b* when force is applied to the support pole 102*b* by a user.

Referring simultaneously to FIGS. 2A and 2B, the bed rail assemblies 100 further include a mattress securing member 110 having a lower end 112, an upper end 114 and vertical members 111 extending therebetween. The upper end 114 comprises a cross rail 113 located at the upper end of the vertical members 111. The cross rail may be of any configuration. Optionally, the cross rail 113 may be provided with a grip member which, when it abuts the mattress, will provide additional friction to assist in securing the mattress securing member 110 in position.

The lower end 112 is configured to be positioned underneath a mattress and may be of any design known in the bed rail art. As exemplified, the lower end 112 includes first and second lower members 122 that extend generally perpendicularly inwardly from a lower end of the vertical members 111. Accordingly, the lower end 112 may be generally L-shaped and configured to be positionable under a mattress. It will be appreciated that the lower members 122 may be of various lengths and may have a length so that, when installed, they extend 6", 12", 18", 24" or more under a mattress whereby the cross rail 113 is relatively stable when used by a person to assist in getting into or out of the bed. Optionally, the inner 122*b* and/or outer 122*a* ends of lower members 122 may be secured together to prevent lateral motion of the lower members 122. As exemplified, an inner cross strut 172 is provided at the inner ends 122*a* of the lower members 122. Similarly, an outer cross strut (not shown) may be provided at the outer ends 122*b* of the lower members 122.

A first connecting member 116 extends between the user support member 102 and the lower end 112 of the mattress securing member 110. As exemplified in FIG. 2A, the first connecting member 116 extends between the lower end 104 of the rail portion 102*a* and the lower end 112 of the mattress securing member 110. The first connecting member extends between inner cross strut 121*a* and inner cross strut 172. As exemplified in FIG. 2B, the first connecting member 116 extends between a collar 155 positioned about a portion of the support pole 102*b* and the inner cross strut 172 of the lower end 112 of the mattress securing member 110.

As exemplified, the first connecting member 116 secures the mattress securing member 110 spaced a first fixed distance 118 from the user support member 102 and facing the user support member 102 with the upper end 114 of the mattress securing member 110 above the lower end 112 of the mattress securing member 110. The mattress securing member 110 is positioned facing the user support member 102 such that the lower member 122 of the mattress securing member 110 extends from the lower end 112 of the mattress securing member 110 towards the user support member 102.

In use, a mattress may be positioned on the lower member 122 of the lower end 112 of the mattress securing member 110 and, where the user support member 102 is the rail portion 102*a*, on the lower member 120 of the lower end 104 of the rail portion 102*a*. The weight of the mattress may counteract an upward lever force from the lower members 120, 122. For example, the upward lever force may be generated at the lower member 120 by rotation about the lower end 104 of the rail portion 102*a* when a force is applied to the hand grip portion 108 at the upper end 106. The counter force from the weight of the mattress may resist the rotation of the rail portion 102*a* about the lower end 104 and may thereby assist in maintaining the rail portion 102*a* upright. It may be understood that one or both of the lower members 120, 122 may be omitted where the connecting member 116 is coupled directly to the lower ends 104, 112 of the rail portion 102*a* and the mattress securing member 110, and the connecting member 116 has sufficient strength and rigidity to withstand the lever force caused by rotation about the lower end 104 of the rail portion 102*a*.

In the illustrated examples, the first connecting member 116 secures the mattress securing member 110 the first fixed distance 118 from the user support member 102. The mattress securing member 110 is positioned facing the user support member 102 such that the lower member 122 of the mattress securing member 110 extends from the lower end 112 of the mattress securing member 110 towards the user support member 102. In FIG. 2A, the lower member 120 of the rail portion 102*a* extends from the lower end 104 of the rail portion 102*a* towards the mattress securing member 110.

The first connecting member 116 may have a length 124 such that the first fixed distance 118 corresponds to a width of a mattress. The width may be that of any standard mattress, such as a single, double, queen, or king mattress, or any other width. Mattresses commonly range in width from about 36 inches to 76 inches, but other widths may be possible. The first fixed distance 118 between the user support member 102 and the mattress securing member 110 may be defined by the length 124 of the first connecting member 116. In FIG. 2A, the length 124 of the first connecting member 116 extends between the lower ends 104, 112 of the rail portion 102*a* and the mattress securing member 110 such that a mattress of the corresponding width may be securely retained between the rail portion 102*a* and the mattress securing member 110. In FIG. 2B, the length 124 of the first connecting member 116 extends between the lower end 112 of the mattress securing member 110 and the vertical member 105 of the support pole 102*b* such that a mattress of the corresponding width may be securely retained between the support pole 102*b* and the mattress securing member 110.

In any embodiment, one or both of the lower members 120, 122 may be omitted. If both of the lower members 120, 122 are omitted, the length 124 of the first connecting member 116 may extend the full width of the mattress between the lower end 104 of the rail portion 102*a* and the lower end 112 of the mattress securing member 110. The length 124 of the first connecting member 116 may similarly extend the full width of the mattress between the vertical member 105 of the support pole 102*b* and the lower end 112 of the mattress securing member 110 where the lower member 122 is omitted. In such embodiments, the length 124 of the first connecting member 116 may be equal to the first fixed distance 118 and correspond to the mattress width.

Figure 3A:
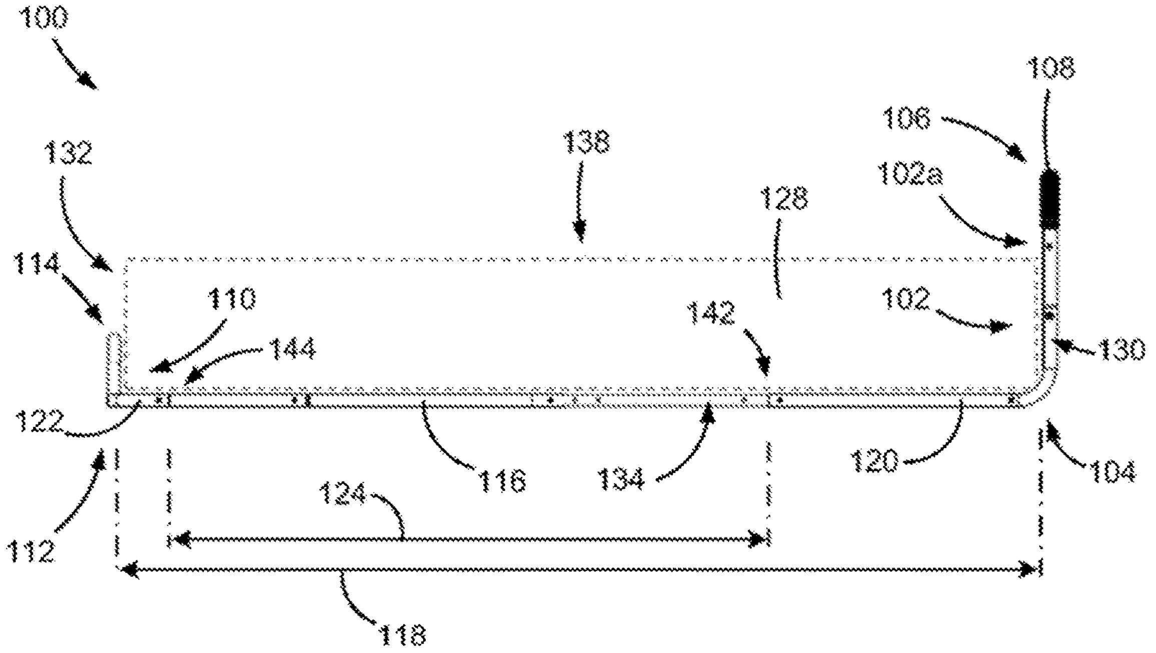
FIG. 3A is a front view of the bed rail assembly of FIG. 2A positioned around a mattress.
Figure 4A:
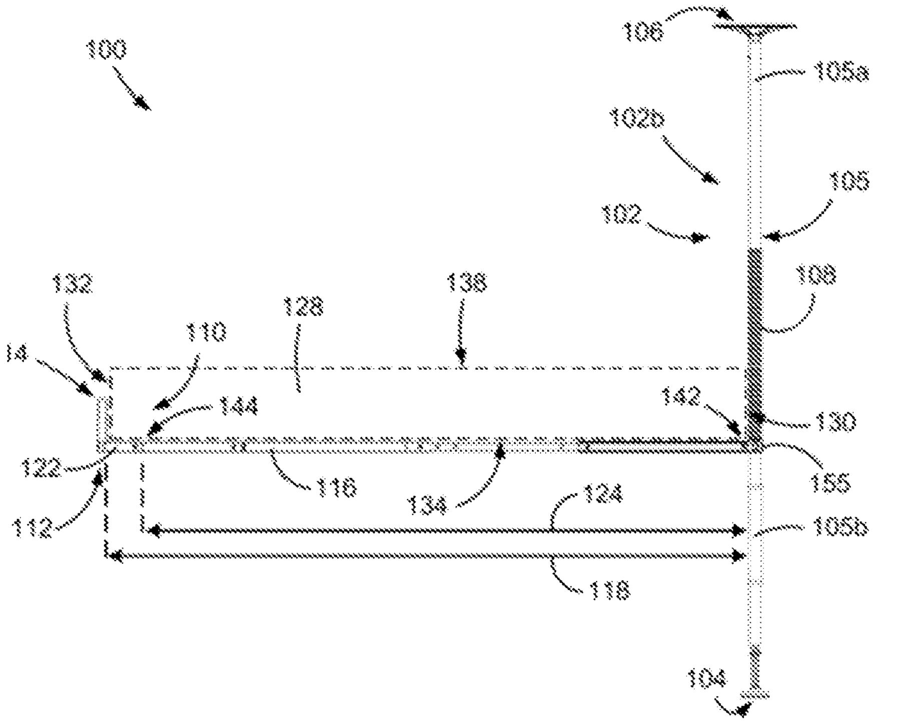
FIG. 4A is a front view of the bed rail assembly of FIG. 2B positioned around a mattress.

If one or both of the lower members 120, 122 are included, then as exemplified in FIGS. 3A and 4A, the length 124 of the first connecting member 116 may extend across only a portion of the width of the mattress. For example, as exemplified in FIG. 3A, the first connecting member 116 extends only a portion of the width of the mattress between the cross strut 121*a* of the lower end 104 of the rail portion 102*a* and the cross strut 172 of the lower member 122 of the lower end 112 of the mattress securing member 110. As another example, as exemplified in FIG. 4A, the first connecting member 116 extends only a portion of the width of the mattress between the vertical member 105 of the support pole 102*b* and the cross strut 172 of the lower member 122 of the lower end 112 of the mattress securing member 110.

The user support member 102 and the mattress securing member 110 may be positionally fixed with respect to each other in at least one direction such that the first fixed distance 118 may not independently increase (i.e., without manual intervention by the user, such as by manual adjustment or disassembly using tools, for example). Accordingly, as discussed in more detail subsequently, the first connecting member 116 may be made of a non-elastic material that is of a fixed length or it may be expandable (e.g., telescopic). Accordingly, the length 124 of the first connecting member 116 may be fixed or locked such that the length 124 cannot increase, and the first fixed distance 118 between the user support member 102 and the mattress securing member 110 may therefore be similarly restricted from increasing. Optionally, the user support member 102 and the mattress securing member 110 may be positionally fixed with respect to each other in two directions such that the first fixed distance 118 may not independently increase or decrease (e.g., the first connecting member may be made of a rigid material such as a metal tube or extrusion).

Figure 3B:
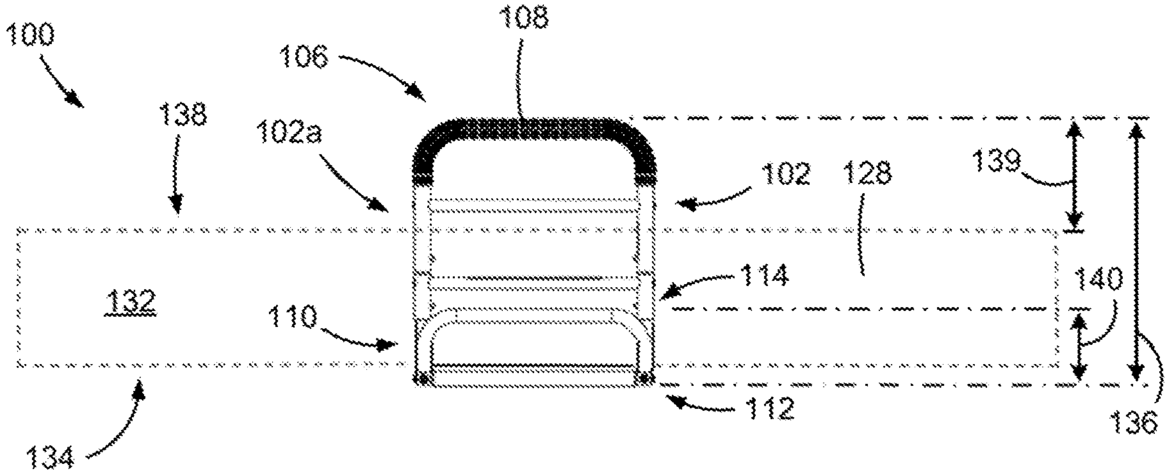
FIG. 3B is a side view of the bed rail assembly of FIG. 2A positioned around the mattress.
Figure 4B:
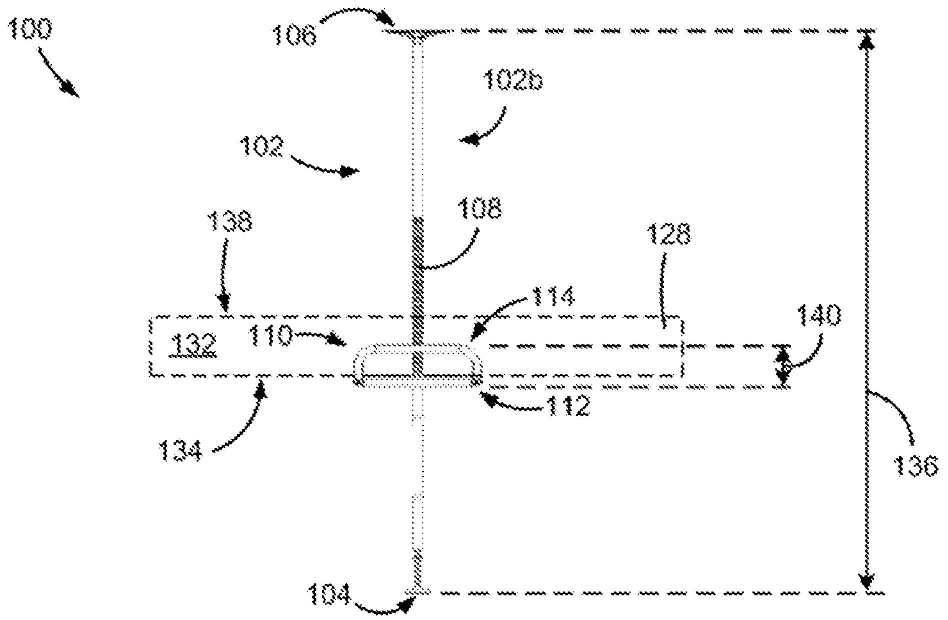
FIG. 4B is a side view of the bed rail assembly of FIG. 2B positioned around the mattress.

As exemplified in FIGS. 3A and 3B, wherein the user support member 102 is the rail portion 102*a*, and in FIGS. 4A and 4B, wherein the user support member 102 is the support pole 102*b*, the bed rail assembly 100 is shown positioned under a mattress 128. The first fixed distance 118 corresponds to the width of the mattress 128 such that the user support member 102 is adjacent, such as abutting, a first longitudinally extending side 130 of the mattress 128 and the mattress securing member 110 is adjacent, such as abutting, a second opposed longitudinally extending side 132 of the mattress 128. The connecting member 116 is positioned at a bottom side 134 of the mattress 128 and extends between the lower member 122 at the lower end 112 of the mattress securing member 110 and the lower member 120 at the lower end 104 of the rail portion 102*a* (in FIG. 3A) and the vertical member 105 of the support pole 102*b* (in FIG. 4A). Accordingly, the connecting member 116 secures the mattress securing member 110 spaced the first fixed distance 118 from the user support member 102, where the first fixed distance 118 is about the width of the mattress 128, and the length 124 of the connecting member 116 is less than the first fixed distance 118.

As exemplified, the bed rail assembly 100 is positioned under the mattress 128 such that the mattress 128 cannot move independent from (i.e., with respect to) the bed rail assembly 100. The user support member 102 and the mattress securing member 110 respectively abut the first and second longitudinally extending sides 130, 132 of the mattress 128 and are held at the first fixed distance 118 by the first connecting member 116. The mattress securing member 110, positionally fixed with respect to the user support member 102 by the first connecting member 116 in at least one longitudinal direction of the connecting member 116, inhibits or prevents the mattress 128 from moving laterally (i.e., in the direction of length 124) from the user support member 102. The bed rail assembly 100 may thereby prevent an entrapment gap from forming between the first longitudinally extending side 130 of the mattress 128 and the user support member 102.

It will be appreciated that a non-slip member or coating may be provided on some or all of the user support member 102 and the mattress securing member 110 which abut the mattress so as to assist in inhibiting or preventing the mattress 128 from moving from the user support member 102. Accordingly, a non-slip member or coating may be provided on one or more cross-struts extending between vertical members 111 and/or between vertical members 105 where the user support member 102 is the rail portion 102*a*.

User Support Member

As exemplified in FIGS. 2A and 3A-3B, the hand grip portion 108 of the rail portion 102*a* has a sufficient vertical height 138 such that it is positioned above the lower end 104 of the rail portion 102*a*. As exemplified in FIGS. 2B and 4A-4B, the hand grip portion 108 of the support pole 102*b* extends along a mid portion of the vertical member 105. It will be appreciated that all of the support pole 102*b* may be provided with a grip material, or part or all of the support pole 102*b* may be textured to provide a grip surface.

The hand grip portion 108 may be gripped by a user to assist the user in performing a variety of tasks. For example, the user may grip the hand grip portion 108 while standing or performing a task, such as dressing, while next to a bed having the bed rail assembly 100. As another example, the user may push and/or pull on the hand grip portion 108 while positioned on a bed having the bed rail assembly 100, such as to reposition on the mattress 128, to assist in getting in/out of the bed, or to assist in transferring between the bed and a wheelchair. The uses described herein are exemplary, and other uses may be possible.

As exemplified, the user support member 102 has a support member height 136 from the lower end 104 of the user support member 102 to the upper end 106 of the user support member 102.

Referring again to FIGS. 2A and 3A-3B, the height 136 is greater than the thickness of a mattress with which it is used so that a person may access the hand grip portion 108 at a location above the upper surface 138 of the mattress. Optionally, the support member height 136 of the rail portion 102*a* may be fixed. In such a case, vertical members 105 may have a fixed length and the bed rail assembly 100 that is used is selected such that the support member height 136 is greater than the height of the mattress with which it is used. Accordingly, a number of bed rail assemblies may be provided, each of which has a rail support member 136 suitable for a mattress having a particular thickness.

Alternately, the support member height 136 of the rail portion 102*a* may be adjustable such that the hand grip portion 108 at the upper end 106 of the rail portion 102*a* may be movable between, and securable in, a plurality of positions with respect to the lower end 104 of the rail portion 102*a*. Accordingly, the support member height 136 may be adjusted based on the thickness of the mattress with which it is used. Mattresses can have a thickness of less than 6 inches, commonly in the range of 6 inches to 16 inches, or in some cases more than 16 inches. In a bed having the bed rail assembly, the hand grip portion 108 may therefore be adjusted to an elevation 139 above the top side 138 of the mattress 128 for a range of mattress thicknesses according to each user's requirements or preferences.

An adjustable support member height 136 of the rail portion 102*a* may also accommodate users of a range of heights, or having different needs or preferences for the position of the hand grip portion 108 relative to the user, a ground surface, and/or a top or upper side 138 of the mattress 128 on a bed having the bed rail assembly 100.

Referring to FIGS. 2B and 4A-4B, the support member height 136 is about the height of the room within which the support pole 102*b* is positioned. Optionally, the support member height 136 of the support pole 102*b* may be fixed at a standard room height, such as about 7', 8', 9', or 10'. In such a case, the vertical member 105 may have a fixed length and the bed rail assembly 100 that is used may be selected such that the support member height 136 is equal to the height of room in which it is used. Accordingly, a number of bed rail assemblies may be provided, each of which has a support member height 136 suitable for a room having a particular height.

Alternately, the support member height 136 of the support pole 102*b* may be adjustable such that the length of the vertical member 105 may be adjusted between, and securable in, a plurality of positions that to correspond to a plurality of room heights. Accordingly, the support member height 136 may be adjusted based on the height of the room in which it is used, which may accommodate a range of uses as well as the additional securement benefits as described previously herein.

As exemplified in FIGS. 2A and 2B, the vertical members 105 may be telescopic vertical members having upper portions 105*a* and lower portions 105*b* that are lockingly telescopically securable together in a plurality of positions. It will be appreciated that any telescopic or expandable members may be used.

Mattress Securing Member

As exemplified in FIGS. 2A to 4B, the upper end 114 of the mattress securing member 110 is positioned above the lower end 112 of the mattress securing member 110. The mattress securing member 110 is positioned abutting the second opposed longitudinally extending side 132 of the mattress 128. The mattress securing member 110 has a mattress securing member height 140 from the lower end 112 of the mattress securing member 110 to the upper end 114 of the mattress securing member 110.

Optionally, the mattress securing member height 140 is less than the thickness of the mattress 128 such that the upper end 114 of the mattress securing member 110 is positioned between the top surface 138 and the bottom surface 134 of the mattress 128 when abutting the second longitudinally extending side 132 of the mattress 128. This may reduce the risk of the mattress securing member 110 forming a potential entrapment zone between the mattress securing member 110 and the second longitudinally extending side 132 of the mattress 128.

As with the user support member 102, the mattress securing member 110 may be of a fixed or variable height. If the mattress securing member 110 is of a fixed height, then the vertical members 111 may have a fixed length and the bed rail assembly that is used is selected such that the mattress securing member height 140 is less than the height of the mattress with which it is used. Accordingly, a number of bed rail assemblies may be provided, each of which has a mattress securing member height 140 suitable for a mattress having a particular thickness.

If the mattress securing member 110 is of a variable height, then the vertical members 111 may also be telescopic as discussed with respect to vertical members 105. Accordingly, the upper end 114 of the mattress securing member 110 may be adjusted to be positioned between the top surface 138 and the bottom surface 134 of the mattress 128 when abutting the second longitudinally extending side 132 of the mattress 128 within a range of thicknesses, such as adjustable within a range of standard mattress thicknesses.

As described previously herein, the mattress securing member 110, in combination with the first connecting member 116 coupling the mattress securing member 110 to the user support member 102, may function to inhibit or prevent the first longitudinally extending side 130 of the mattress 128 from separating laterally away from the user support member 102 and thereby forming an entrapment gap. The mattress 128 may be retained securely between the user support member 102 and the mattress securing member 110 such that the mattress 128 cannot move independently, or sufficiently independently, from the bed rail assembly 100 to create an entrapment gap. The mattress securing member height 140 of the mattress securing member 110 may therefore be selected or adjusted such that the mattress securing member 110 extends up at least a portion of the thickness of the mattress 128 to provide sufficient hold to retain the mattress 128 in position. The mattress securing member height 140 may be between 10% and 100%, or between 20% and 85%, between 25% and 75% of the thickness of the mattress 128, or any range therebetween. This may prevent the bottom side 134 of the mattress 128 from jumping the upper end 114 of the mattress securing member 110 and thus permitting the mattress 128 to separate from the user support member 102 and form an entrapment gap.

It will be appreciated that configurations of the mattress securing member other than those described in detail herein are possible. The mattress securing member may be any shape suitable for holding the mattress as described and having means for coupling to the connecting member. That is, it may be possible to use any mattress securing member configured to extend along a portion of the side of a mattress, optionally also extending under the mattress, and couple to a user support member at an opposed side of the mattress to cooperatively hold the mattress in place. For example, the mattress securing member may be a frame of tubes or bars that are screwed or welded together; a one piece member bent to about a 90-degree angle such as sheet metal, molded plastic (e.g., injection molded), vacuum formed plastic, or blow molded plastic; or a two piece member such as two members (e.g., made of metal, plastic, wood) connected at a hinge, where the hinge is limited to about 90-degrees of rotation.

Connecting Member

The length 124 of the first connecting member 116 extends from a first end 142 of the first connecting member 116 to a second end 144 of the first connecting member 116. The connecting member 116 may be secured to any portion of the user support member 102 and the mattress securing member 110, such as the lower end of the mattress securing member 110 and the lower end of the rail portion 102*a* or, e.g., a mid-portion or support pole 102*b*. As exemplified in FIG. 2A, the first end 142 of the first connecting member 116 is coupled (optionally removably coupled) to the lower end 104 of the rail portion 102*a* (e.g., cross strut 121*a*) and the second end 144 of the first connecting member 116 is coupled (optionally removably coupled) to the lower end 112 of the mattress securing member 110 (e.g., cross strut 172). As exemplified in FIG. 2B, the first end 142 of the first connecting member 116 is coupled (optionally removably coupled) to a mid portion of the support pole 102*b* and the second end 144 of the first connecting member 116 is coupled (optionally removably coupled) to the lower end 112 of the mattress securing member 110 (e.g., cross strut 172).

As described previously herein, the first connecting member may be of a fixed or variable length. As discussed subsequently, the length 124 of the first connecting member 116 may be adjustable such that the mattress securing member 110 may be secured at a plurality of fixed distances from the user support member 102. Each of the plurality of fixed distances may correspond to a different mattress width, which may permit use of the bed rail assembly 100 with a plurality of mattress sizes.

Accordingly, the connecting member 116 may be of a fixed length but a plurality (e.g., 2 or more) of the connecting members may be available (e.g., provided as a kit with the user support member 102 and the mattress securing member 110) wherein the connecting members have different lengths. Each connecting member may be securable to the user support member 102 and the mattress securing member 110. Accordingly, the user support member 102 and the mattress securing member 110 may be secured together at a number of different lengths 124.

Alternately, the first connecting member may comprise a plurality of extension members 146 that are securable together to provide a first connecting member 116 of a set fixed length, or wherein only some or all of the extension members 146 are connectable together in different combinations wherein each combination provides a first connecting member having a particular, but different, length or wherein only some or all of the extension members 146 are slideably insertable with each other to provide a first connecting member that may have a plurality of different lengths.

FIG. 2A exemplifies connecting members that are slidably insertable with each other to provide a first connecting member that may have a plurality of different lengths. As exemplified, the first connecting member 116 is a telescopically adjustable member that is securable in a plurality of positions. Each of the plurality of positions may define a different length 124 of the first connecting member 116. The mattress securing member 110 may therefore be securable at a plurality of fixed distances 118 from the user support member 102 corresponding to the plurality of positions, or lengths 124, at which the telescopically adjustable member 116 is secured, which may correspond to different mattress widths. Any means known in the telescopic member art may be used.

As exemplified in FIG. 2A, the first connecting member 116 includes a plurality of extension members 146. Viewing from left to right, the extension members 146 have a stepwise decrease in radius such that they can be nested. That is, extension member 146*b* is slidably receivable within extension member 146*a*, extension member 146*c* is slidably receivable in extension member 146*b*, and extension member 146*d* is slidably receivable in extension member 146*c*. Any number of extension members may be used.

The extension members 146 of the connecting member 116 may be securable at any pre-determined length 124 from a length wherein all extension members 146 are nested within extension member 146*a* to a length wherein all extension members 146 are fully extended. The extension members 146 of the connecting member 116 are also securable at any intermediate length including lengths wherein only some extension members 146 are extended, or wherein some or all extension members 146 are partially extended. It will be appreciated that the extension members may have the same length or differing lengths.

Alternately, as exemplified in FIG. 2B, instead of being telescopic, the extension members 146 may be separate extension members 146 that are connectable to each other so as to produce a connecting member 116 having a desired length 124 and thereby produce the desired first fixed distance 118 between the user support member 102 and the mattress securing member 110. Each of such extension members 146 may have similar or different lengths, and may be selectively connected wherein a certain number and/or combination of extension members 146 yields the first connecting member 116 of the desired length 124. For example, the connecting member 116 may include one, two, three, four, or more extension members 146, to produce the first fixed distance 118 corresponding to a single, double, queen, or king mattress width, respectively. As exemplified, the connecting member 116 includes five extension members 146*a*-146*e* of various lengths.

Any means of connecting the extension members 146 to each other that is known in the art may be used. For example, in FIG. 2B the extension members 146 have a first end with a male threaded connection and a second end with a female threaded connection for threadably engaging the male threaded connection of an adjoining extension member 146. As another example, the first end may be a male connector end and the second end may be a female connector end for receiving the male connector end, the male connector end may have a radially extending pin biased to an extended position, and the female connector end may have an aperture for receiving the pin, where the pin must be moved to a depressed position prior to connecting or disconnecting the extension members.

Alternately, as exemplified in FIG. 2A, the extension members 146 include locking members 148 configured to secure the relative positioning of each extension member 146. The locking members 148 may be any means known in the art to secure the relative positioning of each extension member 146. The locking members 148 may require tools to lock and unlock such that the extension members 146 are secured at the set length 124 of the connecting member 116 and the length 124 may not independently change without manual adjustment by the user.

Accordingly, the locking members 148 may be bolts threadably received through a bore in an outer extension member that may engage an inner extension member. Using extension members 146*a*, 146*b* for illustrative purposes, the bolt may engage the inner extension member 146*b* through the bore in the outer extension member 146*a* to fix the position of the extension member 146*b* relative to the extension member 146*a*. In some examples, the extension member 146*b* may have one or more bores spaced along its length for receiving the bolt, each bore corresponding to a relative position of the extension member 146*b* to extension member 146*a*. In other examples, using extension members 146*a*, 146*b* again for illustrative purposes, the locking member 148 may be a pin extending radially from the inner extension member 146*b* and movable between an extended position (to which it is biased) and a depressed position. The pin may be receivable in a corresponding aperture in the outer extension member 146*a*. The extension member 146*a* may have one or more apertures spaced along its length for receiving the pin, each aperture corresponding to a relative position of the extension member 146*a*, 146*b*. It may be understood that any number of extension members with any number of adjustable length positions may be possible. Any other means of fixing the relative positioning of the extension members may also be possible.

Figure 5A:
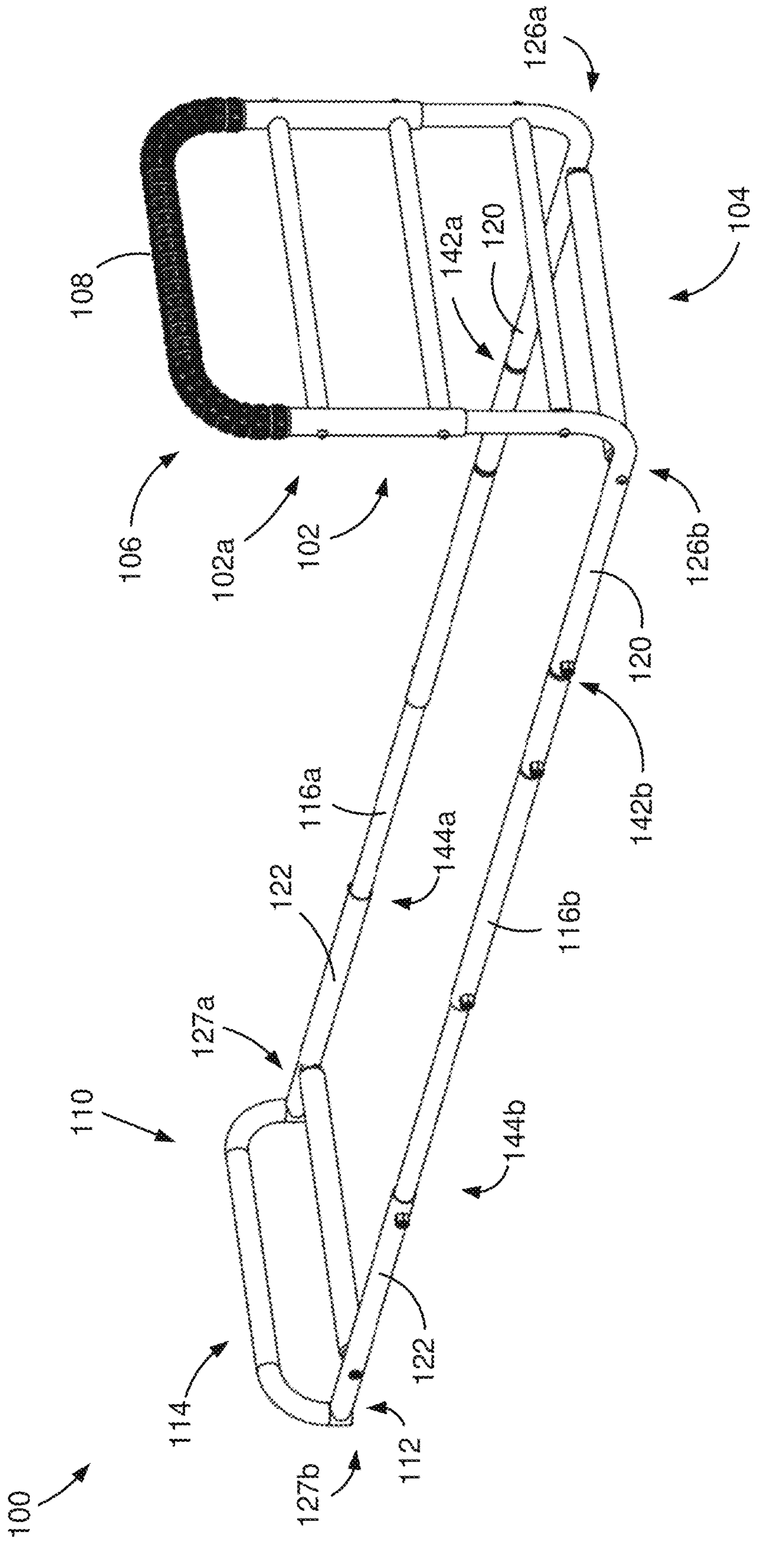
FIG. 5A is a perspective view of another example bed rail assembly wherein the bed rail assembly has two connecting members and the user support member is a rail portion.

Optionally, the bed rail assembly may further include two or more laterally spaced apart connecting members. As exemplified in FIG. 5A, another example bed rail assembly generally shown as 100 has a first and second laterally spaced apart connecting members 116*a*, 116*b*. The rail portion 102*a* has first and second longitudinally spaced apart ends 126*a*, 126*b*. The mattress securing member 110 has first and second longitudinally spaced apart ends 127*a*, 127*b*. The first connecting member 116*a* secures the first end 127*a* of the mattress securing member 110 the first fixed distance 118 from the first end 126*a* of the rail portion 102*a*. The second connecting member 116*b* secures the second end 127*b* of the mattress securing member 110 the first fixed distance 118 from the second end 126*b* of the rail portion 102*a*. It will be appreciated that the connecting members 116*a*, 116*b* may be located at any locations along the width of the rail portion 102*a* and the mattress securing member 110.

Figure 5B:
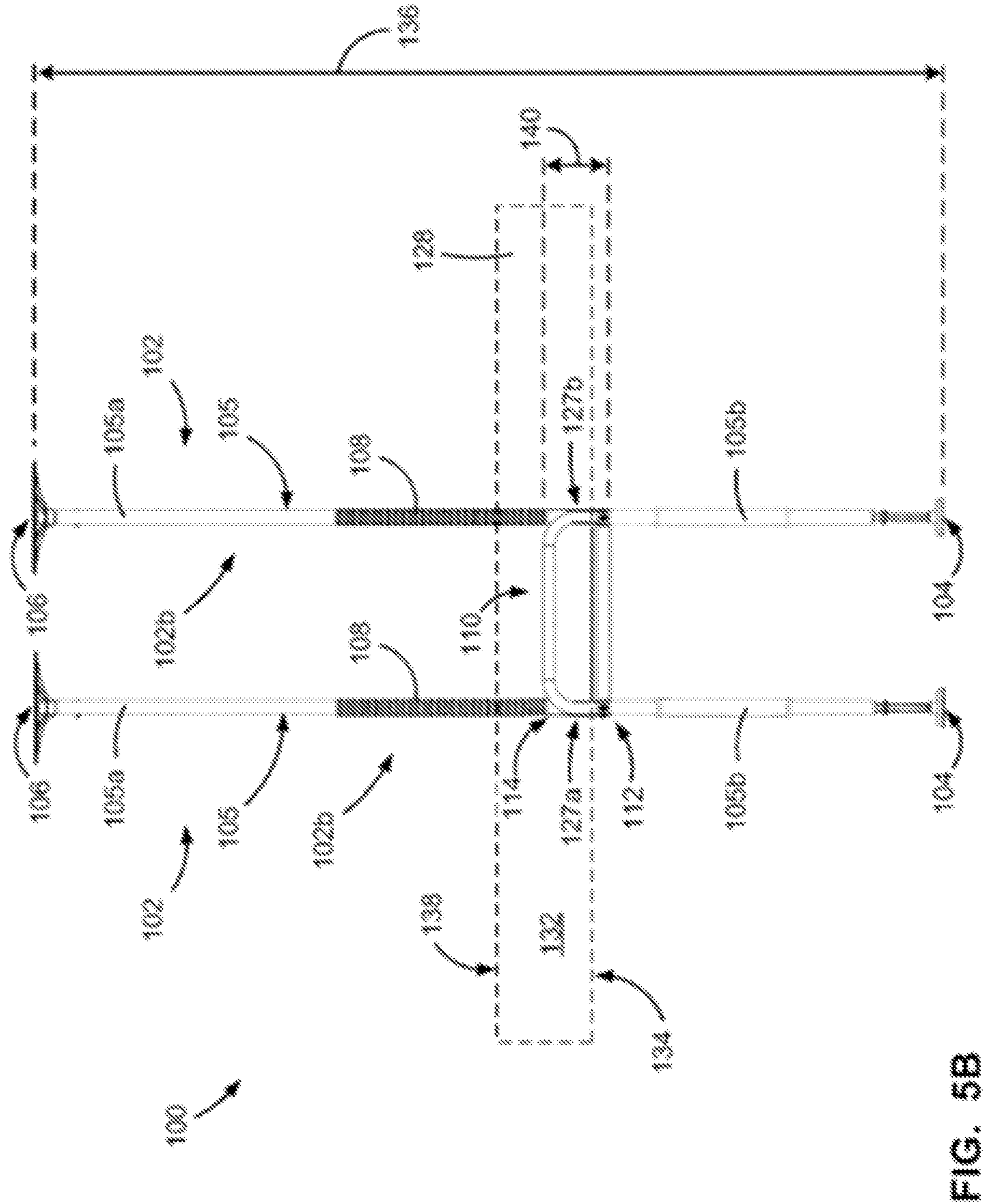
FIG. 5B is a side view of another example bed rail assembly wherein the user support member of the bed rail assembly includes two support poles.

As exemplified in FIG. 5B, another example bed rail assembly generally shown as 100 has two support poles 102*b* laterally spaced apart along one of the longitudinally extending sides of the mattress 128. The bed rail assembly 100 may include first and second laterally spaced apart connecting members 116*a*, 116*b* that respectively secure the first and second ends 127*a*, 127*b* of the mattress securing member 110 the first fixed distance 118 from respective support poles 102*b*. The support poles 102*b* may be connected by one or more cross struts (not shown) extending between the support poles 102*b* at various positions to help provide additional stability and/or help fix the relative position of the support poles 102*b*. A user may wish to enter or exit the bed between the support poles 102*b* such that both hands of the user may grip respective hand grip portions 108 for added stability. Accordingly, the cross strut(s) may be positioned so as to avoid creating an obstruction, clearance hazard, or tripping hazard. For example, a cross strut may be positioned proximate the mattress 128, such as proximate the bottom surface 134 of the mattress 128. In any embodiment where two support poles 102*b* are used, a single connecting member 116 may be used and extend between the lower end 112 of the mattress securing member 110 (e.g., as in FIG. 2B) and the cross strut extending between the support poles 102*b* proximate the lower surface 134 of the mattress 128. Accordingly, the cross strut(s) may be adjustable along the length of the vertical members 105 and securable in a plurality of positions for a range of configurations.

Using more than one connecting member may provide additional stability to the bed rail assembly 100 in accordance with any of the embodiments described herein. For example, in the example illustrated in FIG. 2A, the single connecting member 116 secures the lower end 104 of the rail portion 102*a* the first fixed distance 118 from the mattress securing member 110. The first fixed distance 118 is secured by the connecting member 116 from a midpoint between the first and second longitudinally spaced apart ends 126*a*, 126*b* of the rail portion 102*a* and a midpoint between the first and second longitudinally spaced apart ends 127*a*, 127*b* of the mattress securing member 110. The connecting member 116 may flex laterally under force applied to the rail portion 102*a* by the user. Accordingly, the bed rail assembly may bend slightly such that one of the first ends 126*a*, 127*a* and the second ends 126*b*, 127*b* of the rail portion 102*a* and mattress securing member 110 may move toward each other, and the other of the first ends 126*a*, 127*a* and the second ends 126*b*, 127*b* of the rail portion 102*a* and mattress securing member 110 may move away from each other.

It will be appreciated, however, that using two connecting members will assist in inhibiting or preventing lateral motion. This may provide additional support to further mitigate against the formation of an entrapment gap between the user support member 102 and the mattress.

The first and second connecting members 116*a*, 116*b* may be any connecting member 116 as described herein. If two or more connecting members are provided, they may be the same or different. If the two or more connecting members are adjustable, then the length of one or each connecting member may be individually adjustable as discussed herein.

Figure 6E:
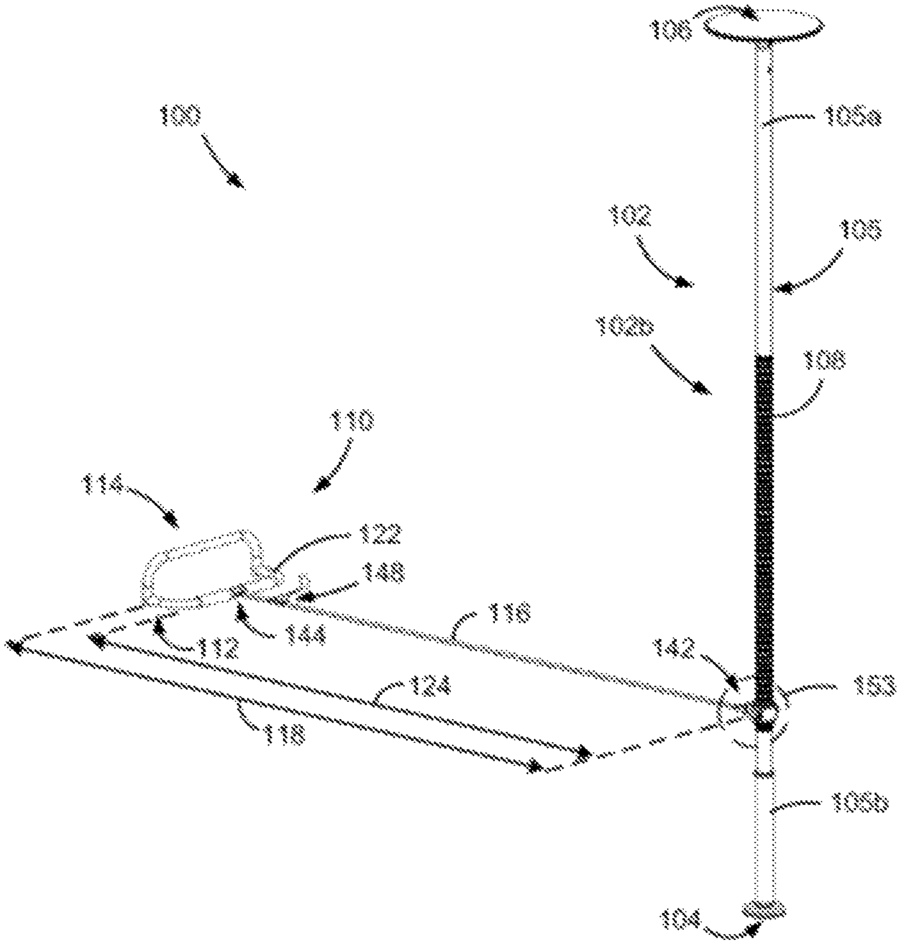
FIG. 6E is a perspective view of another example bed rail assembly wherein the bedrail has one flexible connecting member, and wherein the user support member is a support pole.

As exemplified in FIGS. 6A, 6B, and 6E, the connecting members 116 may be flexible members. For example, they may be flexible straps, which may be made of a woven or non-woven material, e.g., similar to the material used for a seat belt for a car.

FIGS. 6A and 6B exemplify bed rail assemblies shown generally as 100, 400 wherein the connecting member are flexible members. While the flexible members 116*a*, 116*b* shown are straps, it may be appreciated that the connecting members 116*a*, 116*b* may be any other flexible member, such as a rope, chain, cable or other non-elastic flexible longitudinally extending member. The flexible member may be bendable but have a sufficiently low elasticity so as to resist stretching whereby the length 124 of the connecting members 116*a*, 116*b*, which might enable a body part of a user to become trapped between the mattress and the user support member 102 of the bed rail assembly 100, 400, is increased.

Optionally, the connecting member(s) 116 may be elastic but have a stretched length that is the desired length 124 for a mattress having a particular width. In this way, when the mattress is retained between the user support member 102 and the mattress securing member 110, the connecting members 116*a*, 116*b* may be under a state of tension wherein the user support member 102 and mattress securing member 110 are pulled against respective first and second longitudinally extending sides of the mattress (e.g., sides 130, 132 of the mattress 128 illustrated in FIG. 3) by the elastic connecting members 116. This may strengthen securement of the bed rail assembly 100, 400 to the mattress. Once stretched to their maximum length, the connecting members 116*a*, 116*b* may then resist additional expansion of the connecting members 116*a*, 116*b*, which may thereby mitigate the risk of a body part of the user becoming trapped between the mattress and the user support member 102 of the bed rail assembly 100, 400.

As discussed previously with respect to rigid connecting members as exemplified in FIGS. 2A and 2B, the flexible connecting members 116 may have a fixed length (see for example FIG. 6A) or they may have a variable length (see for example FIG. 6B).

For example, the connecting member 116 may be a fixed length longitudinally extending member having ends that are securable at only a certain position along the length of the connecting member to the user support member 102 and the mattress securing member 110. Accordingly, the first end 142*a*, 142*b* of the flexible members 116*a*, 116*b* may each have an end member that is securable to the user support member 102 and the second ends 144*a*, 144*b* of the flexible members 116*a*, 116*b* may each have an end member that is securable to the mattress securing member 110.

Alternately, the length 124 of the flexible connecting members 116*a*, 116*b* may be adjustable. As exemplified in FIGS. 6B and 6D, the flexible connecting members 116*a*, 116*b* include a locking member 148 disposed along the length 124 of the flexible members 116*a*, 116*b*. The locking members 148 shown are buckles. An end of the flexible connecting member 116 may be fed through the buckle and secured at a desired position thereby setting the length of the flexible connecting member at a desired length. Such locking members 148 enable the length of the flexible connecting members to be infinitely adjustable. It will be understood that a ratchet or any type of buckle may be suitable for use as the locking members 148. The locking members 148 lock the flexible members 116*a*, 116*b* at the length 124 set by the user. The locking members 148 therefore facilitate use of the bed rail assembly 400 having the flexible members 116*a*, 116*b* with a range of mattress widths by permitting adjustment between, and locking at, a plurality of lengths 124 of the connecting members 116*a*, 116*b*.

FIG. 6E exemplifies a bed rail assembly shown generally as 100, wherein the single connecting member 116 extending between the mattress securing member 110 and the support post 102*b* is a flexible member similar to that described with respect to FIG. 6B.

FIGS. 6C and 6D exemplify end members that may be used to secure a connecting member to a user support member 102 or a mattress securing member 110. For ease of reference FIGS. 6C and 6D are described without using numbering specific to any one of the connecting members of FIGS. 6A and 6B, and the corresponding descriptions may be understood to apply equally to each end of each connecting member.

FIG. 6C exemplifies the first end 142 of the flexible member 116 wherein the end member is a fixed stitched loop 154 that may be slid onto a cross strut such as cross strut 121*a* or 122*a*. It will be appreciated that loop 154 may be openable (e.g., it may be openable loop such as using hook and loop fasteners or a buckle to releasably form the loop around a cross strut).

FIG. 6D is an enlarged view of the section 152 of FIG. 6B showing the second end 144*b* of the second connecting member 116*b* coupled to the lower end 112 of the mattress securing member 110. Alternately, as exemplified in FIG. 6D, the loop 154 of the second end 144 of the flexible member 116 may be coupled or releasably coupled to the lower end 112 of the mattress securing member 110 using a loop connector 156 that extends through the loop 154 and is secured to the rail portion 102*a* or the mattress securing member 110. As exemplified, the loop connector 156 may be a generally U-shaped member that is received in apertures in a rail or strut.

Figure 6F:
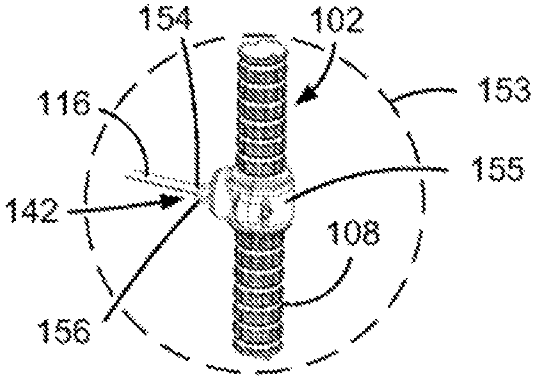
FIG. 6F is an enlarged view of a portion of the bed rail assembly of FIG. 6E.

FIG. 6F is an enlarged view of the section 153 of FIG. 6E showing the first end 142 of the connecting member 116 coupled to a portion of the vertical member 105 of the support pole 102*b*. As exemplified, the loop 154 of the first end 142 of the flexible member 116 may be coupled or releasably coupled to a loop connector 156 that extends through the loop 154. The loop connector 156 is secured to a collar 155. The position of the collar 155 may be adjusted to change the portion of the vertical member 105 to which the flexible member 116 is coupled, which may facilitate use with a variety of beds of a range of heights. For example, the collar 155 may be an openable clamp having an interior opening sized to receive the vertical member 105 of the support pole 102*b*. The collar 155 may be clamped to the desired portion of the vertical member 105 and may be tightened and/or locked, such as using a nut and bolt through a flange of the collar, for example, to secure the collar 155 to the portion of the vertical member 105.

It will be appreciated the that the first and second ends of the connecting members of FIGS. 6A, 6B, and 6E may be the same or different.

It will be appreciated one end of a flexible connecting member may be permanently mounted to the user support member 102 and/or the other may be permanently mounted to the mattress securing member 110. For example, a cross strut may extend through the loop 154 to couple the second end 144 of the connecting member 116 to the mattress securing member 110. In such examples, the cross strut may be passed through the loop 154 during assembly of the bed rail assembly.

Alternately, as previously discussed, one or both of the ends may be non-removably mounted to the user support member 102 and/or the mattress securing member 110 when the bed rail assembly is assembled and in use (e.g., by using a closed loop as exemplified in FIG. 6C or removably mounted by using an openable loop).

Figure 7A:
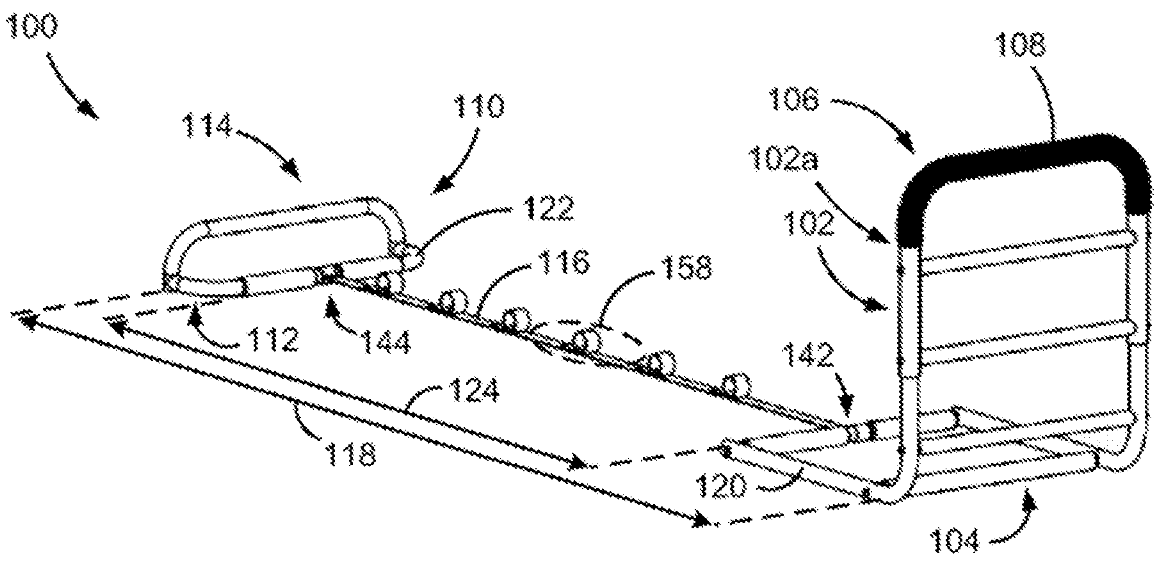
FIG. 7A is a perspective view of another example bed rail assembly wherein the bed rail assembly has one flexible connecting member, and wherein the user support member is a rail portion.
Figure 7B:
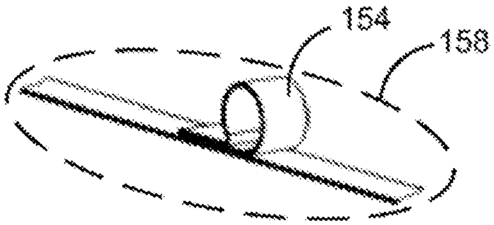
FIG. 7B is an enlarged view of a first portion of the bed rail assembly of FIG. 7A.
Figure 7C:
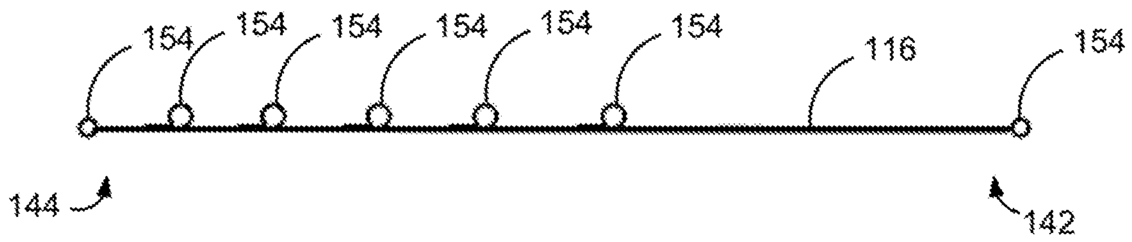
FIG. 7C is a side view of the flexible connecting member of FIG. 7A.
Figure 7D:
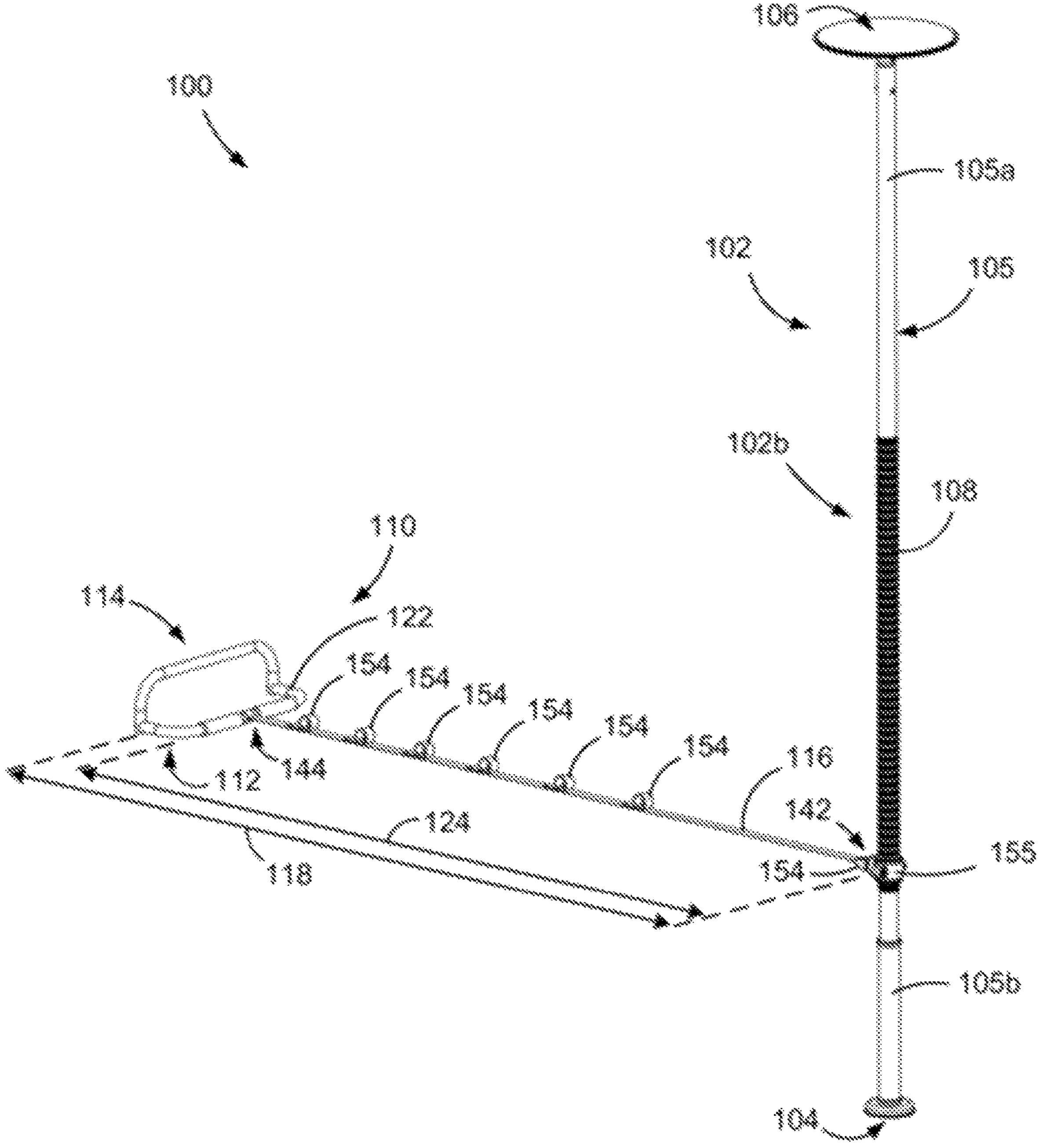
FIG. 7D is a perspective view of another example bed rail assembly wherein the bedrail has one flexible connecting member, and wherein the user support member is a support pole.

Alternately, as exemplified in FIGS. 7A, 7B (showing an enlarged view of section 158 in FIG. 7A), and 7D (using a similar connecting member as shown in FIG. 7A with a support pole 102*b*), a flexible connecting member 116 may have a plurality (2 or more) of portions 154, each of which is connectable to a user support member 102 or mattress securing member 110. Accordingly, instead of using a locking member 148 to adjust the length of a flexible connecting member, the flexible connecting member 116 may have a plurality of portions 154 that can be secured to, e.g., a cross strut or loop connector. As exemplified in FIG. 7C, showing a side view of the flexible member 116 of FIGS. 7A and 7D, the flexible member 116 includes a plurality of loops 154 disposed along its fixed length 124. The flexible member may include loops 154 at the first and/or second ends 142, 144. The loops 154 may be fixed stitched loops similar to those described previously herein, but may be openable loops in some examples. Accordingly, the first fixed distance 118 is adjustable to correspond to a plurality of mattress widths by changing the loops 154 along the length 124 of the flexible member 116 to which the lower end 104 of the rail portion 102*a* or the collar 155 of the support post 102*b*, and the mattress securing member 110, are connected.

Bed Base Anchor

Optionally, the bed rail assembly 100 may be secured or removably secured to a bed base and/or a box spring.

One or more anchor members 160, 162 may be used. For example, each of the user support member 102 and the mattress securing member 110 may have an anchor member, and each anchor member may be secured to a portion of a bed base (e.g., screwed thereto or wrapped around a strut thereof). Alternately, two anchor members may be provided, and the anchor members may be wrapped around a box frame and/or a portion of the bed base and secured to each other whereby the bed rail assembly is secured to a box frame and/or the bed base. The anchor members may be extensions of the connecting member(s) 116, or may form additional connecting members.

The first and second anchor members 160, 162 may be any members which may be used to secure or removably secure the assembly 100 to a bed base and/or a box spring. The anchor members may be flexible straps (similar to the flexible connecting members 116 such as a nylon strap) that have one end that may be permanently mounted or releasably securable to the user support member 102 or mattress securing member 110. The other end may be secured to a bed base and/or to each other.

Figure 8:
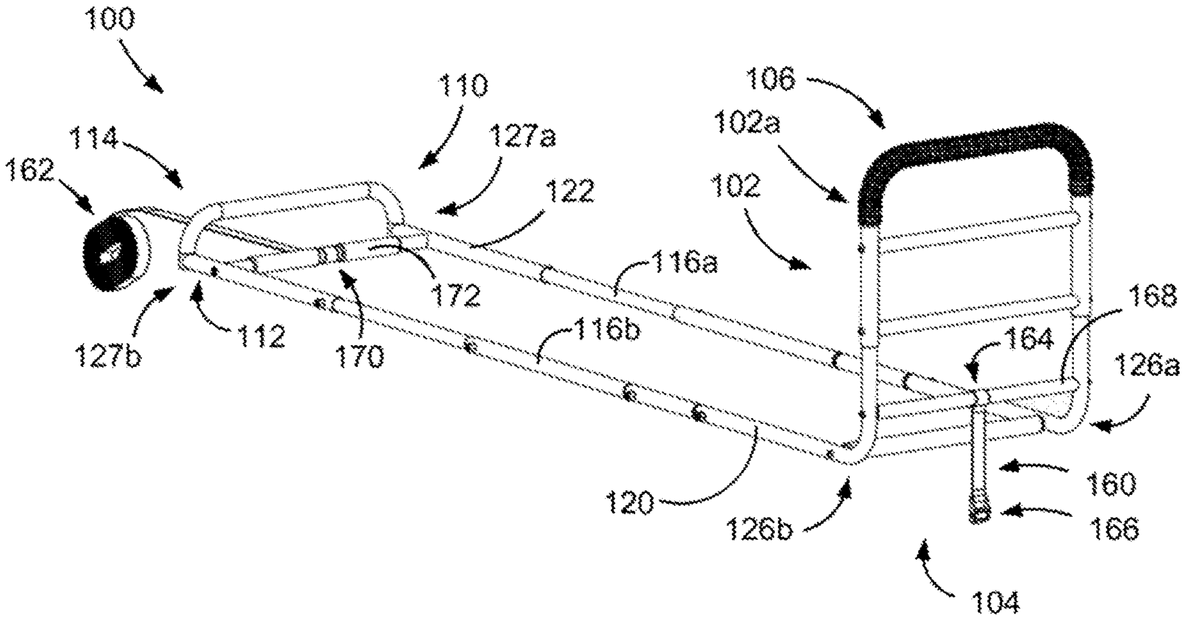
FIG. 8 is a perspective view of the bed rail assembly of FIG. 5A having first and second anchor members.
Figure 9A:
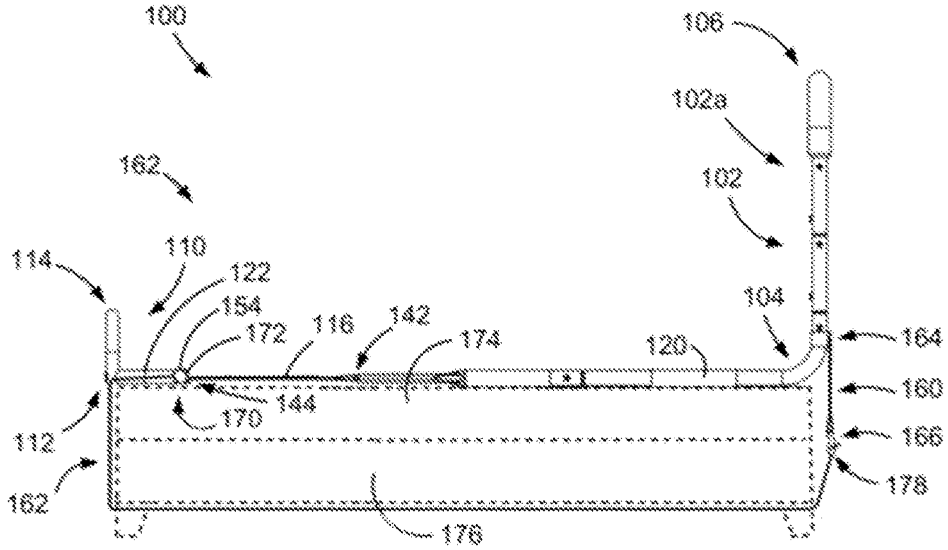
FIG. 9A is a front view of the bed rail assembly of FIG. 6A wherein the bed rail assembly is secured to a box spring and bed base and the user support member is a rail portion.
Figure 9B:
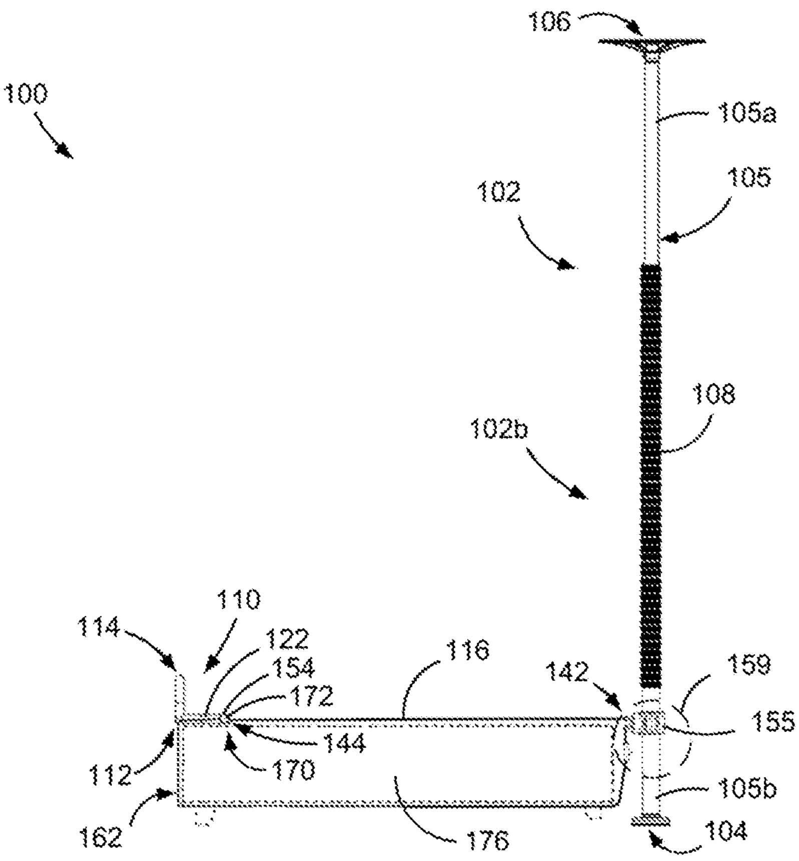
FIG. 9B is a front view of the bed rail assembly of FIG. 6E wherein the bed rail assembly is secured to a bed base and the user support member is a support pole.
Figure 9C:
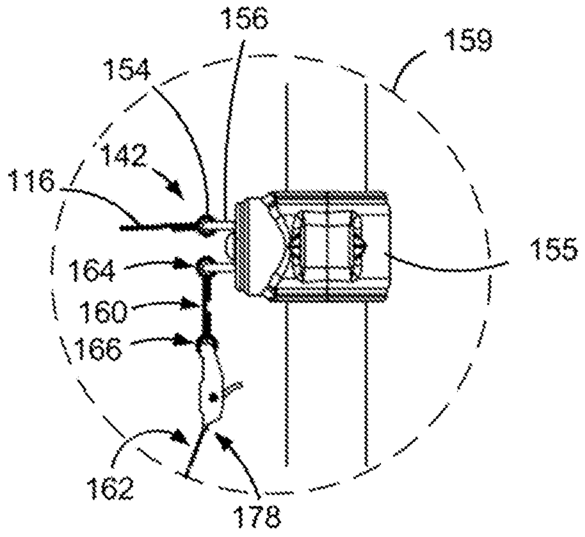
FIG. 9C is an enlarged front view of a portion of the bed rail assembly of FIG. 9B.
Figure 9D:
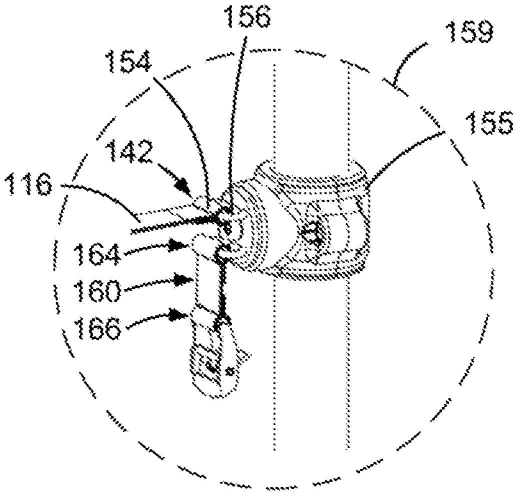
FIG. 9D is an enlarged perspective view of the portion of the bed rail assembly of FIG. 9C.
Figure 10:
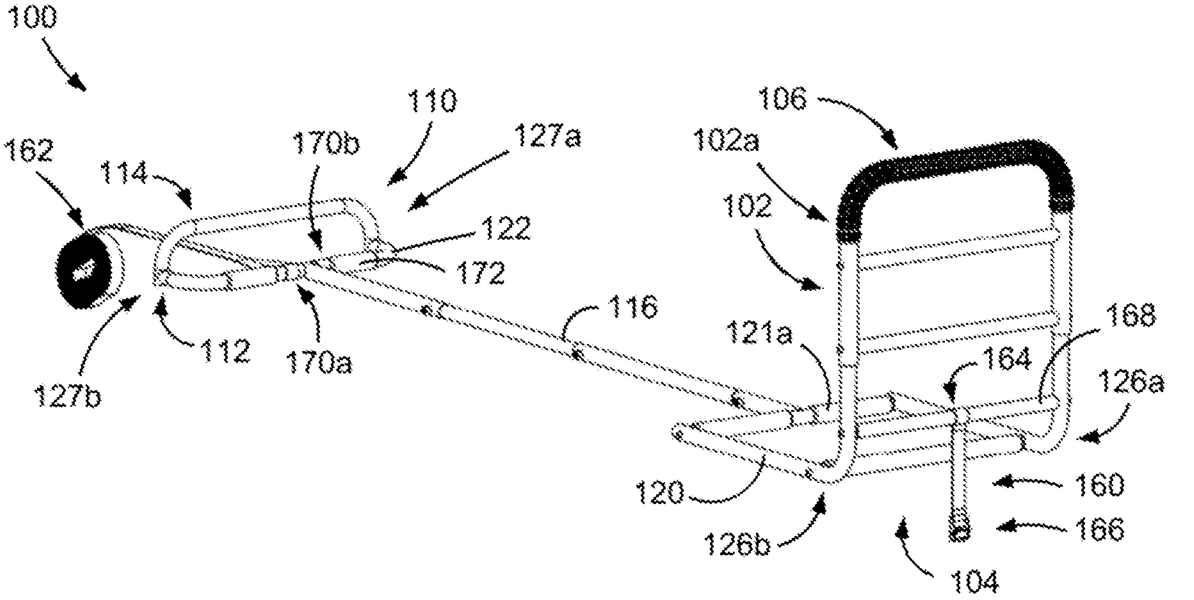
FIG. 10 is a perspective view of the bed rail assembly of FIG. 2 having first and second anchor members.

As exemplified in FIGS. 8 to 10, the bed rail assembly 100 includes a first anchor member 160 and a second anchor member 162. The first and second anchor members 160, 162 may be wrapped around a bed base and secured to each other to form an additional connecting member, or an extension of an existing connecting member 116, that secures the bed rail assembly 100 to the bed base upon which a mattress is to be positioned.

As exemplified in FIGS. 8, 9A, and 10, the first anchor member 160 is coupled to the rail portion 102*a*. The first anchor member 160 has a first end 164 and a second end 166. The rail portion 102*a* includes at least one cross strut 168 extending between the first and second longitudinally spaced apart ends 126*a*, 126*b* of the rail portion 102*a*, and the first end 164 of the first anchor member 160 is coupled to the cross strut 168. Any member discussed with respect to connecting members 116 may be used, such as a closed loop.

Alternately, as exemplified in FIGS. 9B, 9C (showing an enlarged view of the portion 159 of FIG. 9B), and 9D (showing an enlarged perspective view of the portion 159 of FIG. 9B), the first anchor member 160 is coupled to the collar 155 secured to the vertical member 105 of the support pole 102*b*. The first anchor member 160 is similar to the first anchor member 160 of FIGS. 8, 9A, and 10, and the first end 164 of the first anchor member 160 is coupled to the loop connector 156 of the collar 155.

The second anchor member 162 in FIGS. 8 to 10 is coupled to the mattress securing member 110. The second anchor member 162 has a first end 170 and a second end 178 (see for example FIGS. 9A and 9B). The first end 170 may be couplable to the mattress securing member 110. Any end member discussed with respect to connecting members 116 may be used, such as a closed loop. As exemplified, the first end 170 of the second anchor member 162 is coupled to the cross strut 172.

It will be appreciated that the anchor members 160, 162 may be an extension of the connecting member 116. In such embodiments, the first connecting member, or each connecting member where more than one connecting member is used, may also be operable to secure at least one of the user support member 102 and the mattress securing member 110 to the bed frame. For example, as exemplified in FIGS. 9A and 9B, the loop 154 at the second end 144 of the connecting member 116 is also the end member at the first end 170 of the second anchor member 162. Accordingly, as exemplified, the connecting member 116 is a flexible member having a length sufficient to extend around the bed frame. As such, when the bed rail assembly is assembled and provided on the bed frame, the mattress securing member 110 is secured the first fixed distance 118 from the user support member 102 and the user support member 102 and the mattress securing member 110 are secured to the bed frame by the connecting member(s).

In any embodiment, such as exemplified in FIGS. 8 and 10, the anchor members 160, 162 may form an additional connecting member separate from or discontinuous with the connecting member(s) 116 (i.e., the connecting members passing between the mattress and bed base/box spring do not share a common end with the connecting members passing under the box spring and/or bed base).

Other coupling members to secure an anchor member 160, 162 to a portion of the bed rail assembly 100 may be used. For example, FIG. 10 shows a dual loop configuration, wherein a loop 170*a*, 170*b* is positioned around the cross strut 172 on either side of the connecting member 116 where the connecting member 116 is coupled to the cross strut 172. It will be appreciated that the connecting member 116, which may be any connecting member described herein, is a first connecting member and the anchor members 160, 162, once connected, may form a second connecting member separate from the first connecting member. The first connecting member may secure the user support member 102 to the mattress securing member 110, and the second connecting member may secure the bed rail assembly to the bed base.

To connect to the second anchor member 162, the second end 166 of the first anchor member 160 includes an anchor member connector, such as a buckle, ratchet, or any other means known in the art for receiving the free end (the second end 178) of the flexible member (anchor connector 162). The free end may be fed through the buckle and tightened using a ratchet, e.g., a ratchet or second anchor member 162 may have a tongue and second end 166 may be a buckle (similar to that of a seatbelt) that lockingly receives the tongue and the length of the second anchor member 162 may then be shortened in a manner similar to a seat belt.

Optionally, the anchor member connector may include a lock requiring tools or a key, for example, to unlock such that the first and second anchor members 160, 162 may not be able to disconnect without manual intervention by the user.

As exemplified in FIG. 9A, the bed rail assembly 100 is shown positioned on a box spring 174 and bed base 176. It may be understood that, in some examples, one of the box spring or the bed base may be omitted, such as exemplified in FIG. 9B wherein the bed rail assembly 100 is shown positioned on a bed base 176 only. The first and second anchor members 160, 162 may have a combined length sufficient to wrap around the box spring 174 and/or bed base 176 such that the second ends 166, 178 of the first and second anchor members 160, 162 may meet and connect. In the illustrated examples, the second anchor member 162 has a length sufficient to extend down the side, across the width, and up the opposite side, of the box spring 174 and bed base 176. To secure the bed rail assembly 100, and any mattress that may be retained between the user support member 102 and mattress securing member 110 thereof, to the box spring 174 and/or bed base 176, the second end 178 of the second anchor member 162 may be connected to the second end 166 of the first anchor member 160. In the illustrated example, the second end 178 of the second anchor member 162 has been fed through the buckle at the second end 166 of the first anchor member 160. The user may pull the second end 178 of the second anchor member 162 to tighten the first and second anchor members 160, 162 around the box spring 174 and/or bed base 176 to positionally fix the bed rail assembly 100 on the box spring 174 and/or bed base 176.

Figure 11A:
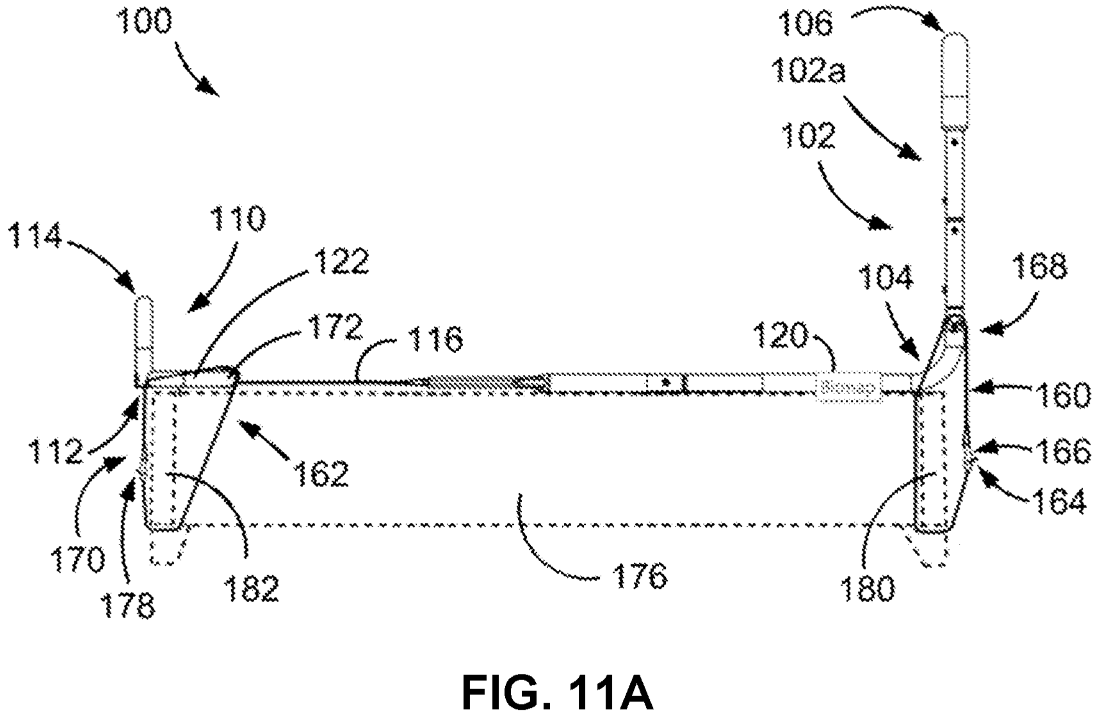
FIG. 11A is a front view of the bed rail assembly of FIG. 6A secured to an alternate bed base.

FIG. 11A exemplifies the bed rail assembly 100 of FIG. 6A using a different method to secure the bed rail assembly 100 to the bed base 176. The bed rail assembly 100 also includes the first anchor member 160 and the second anchor member 162. The first anchor member 160 couples the rail portion 102*a* to a first longitudinally extending bed base member 180. In this embodiment, the first end 164 of the first anchor member 160 is a free end and the second end 166 of the first anchor member includes an anchor member connector, such as a buckle, as discussed with respect to FIG. 9. Accordingly, the rail portion 102*a* is secured to the bed base 176 by wrapping the first anchor member 160 around the cross strut 168 of the rail portion 102*a* and the first longitudinally extending bed base member 180 of the bed base 176, and connecting the first end 164 of the first anchor member 160 with the second end 166 of the first anchor member 160.

Figure 11B:
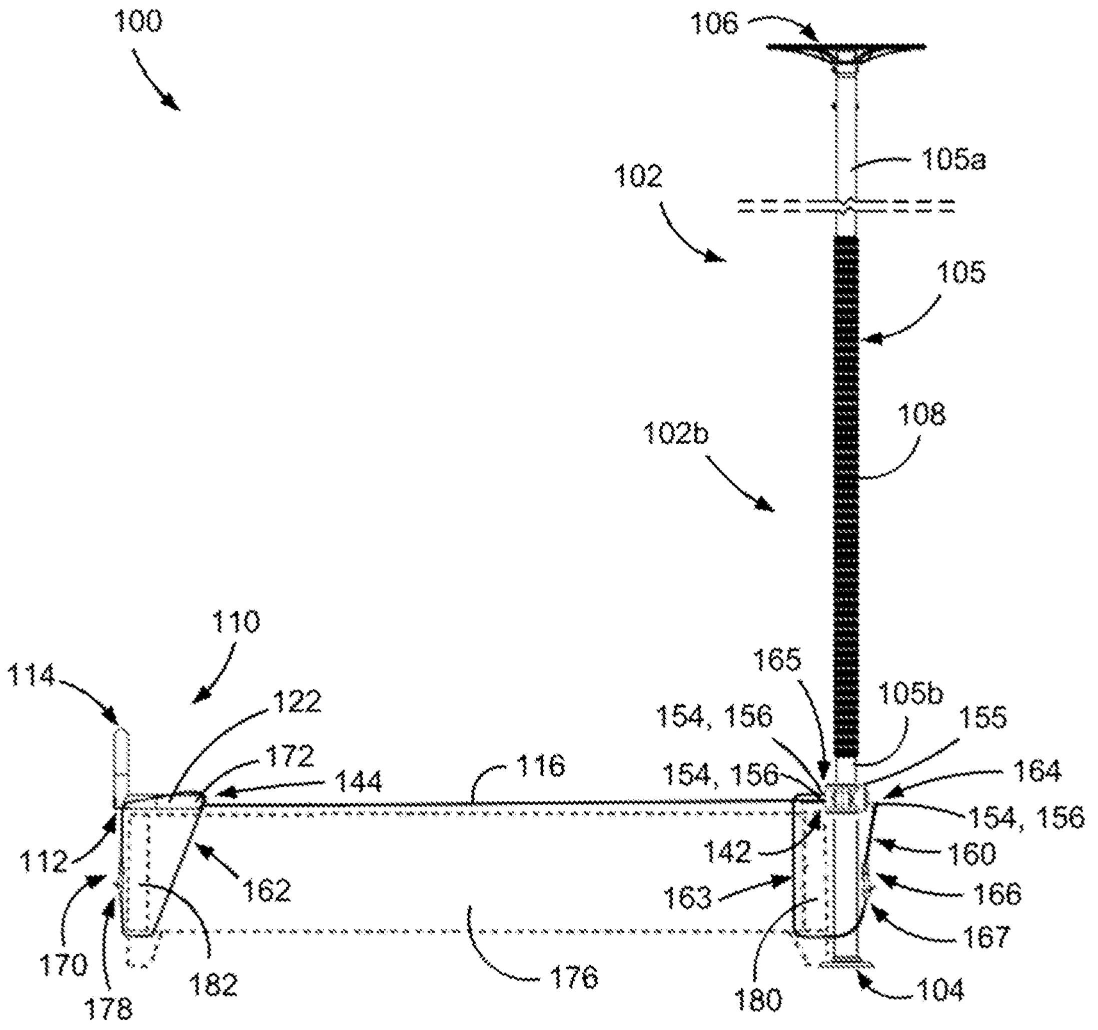
FIG. 11B is a front view of the bed rail assembly of FIG. 6E secured to an alternate bed base.

FIG. 11B exemplifies the bed rail assembly 100 of FIG. 6E using a similar method to secure the bed rail assembly 100 to the bed base 176 to that described with respect to FIG. 11A. In this embodiment, the first end 164 of the first anchor member 160 includes a loop 154 secured to a loop connector 156 of the collar 155, the loop connector 156 opposite the bed-facing side of the support pole 102*b*. The second end 166 of the first anchor member 160 includes an anchor member connector, such as a buckle, as discussed with respect to FIG. 9. A third anchor member 166 has a first end 165 including a loop 154 secured to another loop connector 156 of the collar on the bed-facing side of the support pole 102*b*, and a second end 167 of the third anchor member 163 is a free end. Accordingly, the support pole 102*b* is secured to the bed base 176 by wrapping the third anchor member 163 around the first longitudinally extending bed base member 180 of the bed base 176, and connecting the second end 167 of the third anchor member 163 with the second end 166 of the first anchor member 160.

In FIGS. 11A and 11B, the second anchor member 162 couples the mattress securing member 110 to a second longitudinally extending bed base member 182. The first end 170 of the second anchor member 162 is a free end and the second end 178 of the second anchor member 162 includes and anchor member connector, such as a buckle. Accordingly, the mattress securing member 110 is secured to the bed base 176 by wrapping the second anchor member 162 around the cross strut 172 of the mattress securing member 110 and the second longitudinally extending bed base member 182 of the bed base 176, and connecting the first end 170 of the second anchor member 162 with the second end 178 of the second anchor member 162. The first and second anchor members 160, 162 may further be tightened and locked as previously described.

Figure 11C:
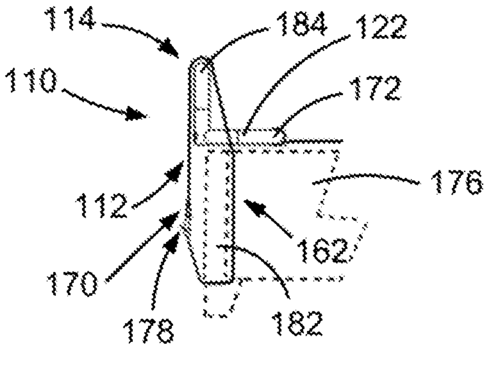
FIG. 11C is an enlarged front view of a portion of the bed rail assembly of FIG. 11B secured to the alternate bed base.

In an alternate example, shown in FIG. 11C, the mattress securing member 110 includes another cross strut 184 extending between the first and second longitudinally spaced apart ends 127*a*, 127*b* of the mattress securing member 110 at the upper end 114. In the illustrated example, the mattress securing member 110 is secured to the bed base 176 by wrapping the second anchor member 162 around the other cross strut 184 of the mattress securing member 110 and the second longitudinally extending bed base member 182 of the bed base 176, and connecting the first end 170 of the second anchor member 162 with the second end 178 of the second anchor member 162.

The first and second anchor members 160, 162 in FIG. 11A, the combined first and third anchor member 160, 163 and the second anchor member 162 in FIG. 11B, and the alternate second anchor member 162 in FIG. 11C, may each be considered an additional connecting member in addition to the connecting member(s) 116, whether continuous with or separate from the connecting member(s) 116. The additional connecting members may secure a portion of the bed rail assembly 100, such as the user support member 102 or the mattress securing member 110, to the bed frame (i.e., box spring and/or bed base).

Figure 12A:
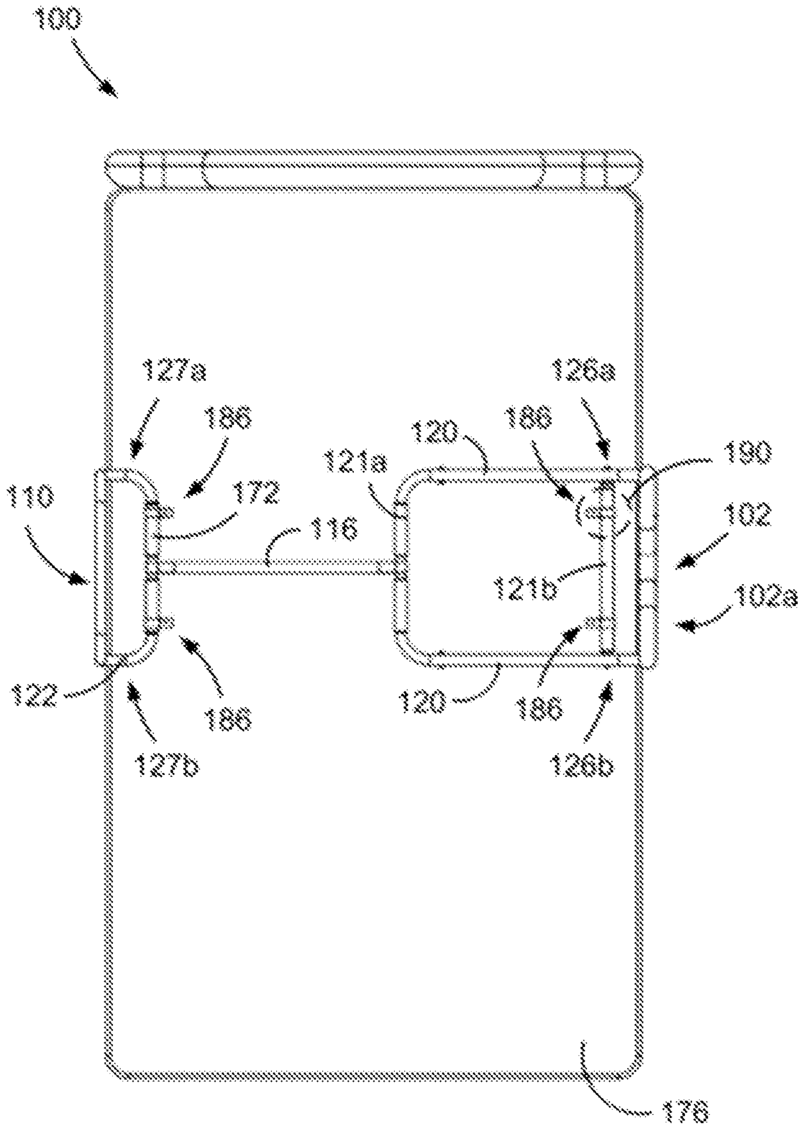
FIG. 12A is a top plan view of the bed rail assembly of FIG. 2 secured to an alternate bed base.

As exemplified in FIG. 12A, the bed rail assembly 100 of FIG. 2 is shown positioned on the bed base 176 using another anchoring means. As exemplified, the bed rail assembly 100 is anchored directly to the bed base 176. The bed rail assembly 100 includes a plurality of anchor channels 186 for securing the bed rail assembly 100, directly to the bed base 176. The anchor channels 186 may be positioned over a portion of any member of the rail portion 102, connecting member 116, and mattress securing member 110 that are positioned against the bed base 176. For example, anchor channels 168 are shown positioned over the cross strut 172 of the lower member 122 of the mattress securing member 110, and over the cross strut 121*b* of the rail portion 102. Any other portions of the lower ends 104, 112, lower members 120, 122, or connecting member 116 may be anchored to the bed base 176 using the anchor channels 186. Any number of anchor channels 186 may be used.

Figure 12B:
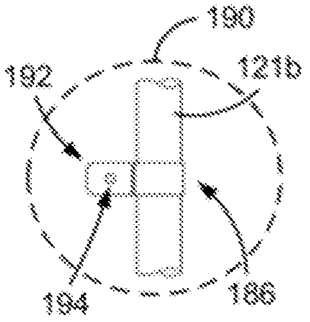
FIG. 12B is an enlarged top plan view of a portion of the bed rail assembly of FIG. 12A.
Figure 12C:
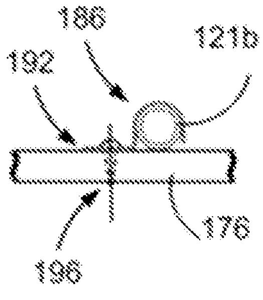
FIG. 12C is a vertical cross-sectional view of the enlarged portion of the bed rail assembly of FIG. 12B.

FIG. 12B shows an enlarged view of the anchor channel 186 from the section 190 of FIG. 12A, and FIG. 12C shows a cross-sectional view of the section 190. In the illustrated example, the anchor channel 186 is positioned over the cross strut 121*b*, and a flange portion 192 having an aperture 194 is positioned on an upper surface of the bed base 176. A fastener 196, such as a nail, screw, or bolt, is driven through the aperture 194 in the flange portion 192 and into the bed base 176. In this way, the anchor channel 186 and the member over which the anchor channel 186 is positioned are secured to the bed base 176. The bed rail assembly 100, and any mattress secured between the rail portion 102*a* and the mattress securing member 110 thereof, may thereby be positionally fixed on the bed base 176.

Kit for a Bed Rail Assembly

A kit for a bed rail assembly may include a user support member, a mattress securing member, and a first connecting member, according to any of the example embodiments described herein. When the kit is assembled and provided on a bed frame, the connecting member may extend between the user support member and the lower end of the mattress securing member. When the kit is assembled and provided on the bed frame, the first connecting member may secure the mattress securing member spaced the first fixed distance from the user support member and facing the user support member with the upper end of the mattress securing member above the lower end of the mattress securing member.

Optionally, the kit may include more than one user support member, mattress securing member, and/or connecting member. For example, the kit may include two connecting members in accordance with some embodiments described herein. As another example, the kit may include more than one connecting member where each connecting member has a different fixed length, each fixed length corresponding to a different mattress width. Similarly, the kit may include more than one rail portion and/or mattress securing member where each has a different fixed height, each fixed height corresponding to a different mattress thickness. In this way, the kit may be useable with a variety of mattress sizes by selecting the appropriately sized element(s) for the particular mattress with which the bed rail assembly is to be used. Where the user support member is a support pole, the kit may include more than one support pole where each has a different fixed height, each fixed height corresponding to a different room height. In this way, the kit may be useable within a variety of rooms by selecting the appropriately sized support pole for the particular room within which the bed rail assembly is to be used.

Optionally, the kit may include more than one type of connecting member, such as any combination of fixed length, adjustable length, and/or extended (i.e., for securing the bed rail assembly to the box spring and/or bed base) connecting members in accordance with any of the embodiments described herein.

Optionally, the kit may include a plurality of anchor members to secure the bed rail assembly to the box spring and/or bed base in accordance with any of the embodiments described herein. The kit may further include more than one anchor member type to facilitate use of the bed rail assembly with a variety of bed frame, including a box spring and/or bed base.

Optionally, the kit may include both a rail portion and a support pole which may be used concurrently using a single connecting member or a plurality (e.g., two) connecting members.

Method of Installing a Portable Bed Rail Assembly

Accordingly, it will be understood that the bed rail assembly 100 may be installed by securing the bed rail assembly to a box spring and or a bed frame. Alternately, the bed rail assembly may not be secured to a box spring or bed frame but placed in an unsecured manner on top of the box spring and, if there is no box spring, the bed frame. Once positioned, a mattress is then positioned between the user support member and the mattress securing member with the user support member and the mattress securing member fixed a preset distance apart on opposed sides of the bed rail.

Figure 13:
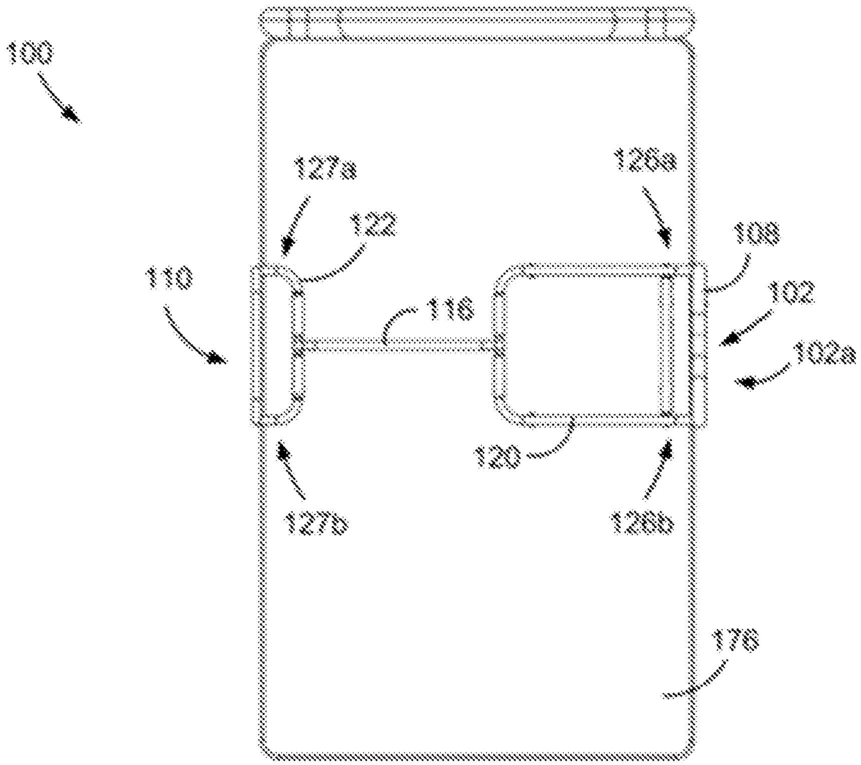
FIG. 13 is a top view of the bed rail assembly of FIG. 2 positioned on an alternate bed base.
Figure 14:
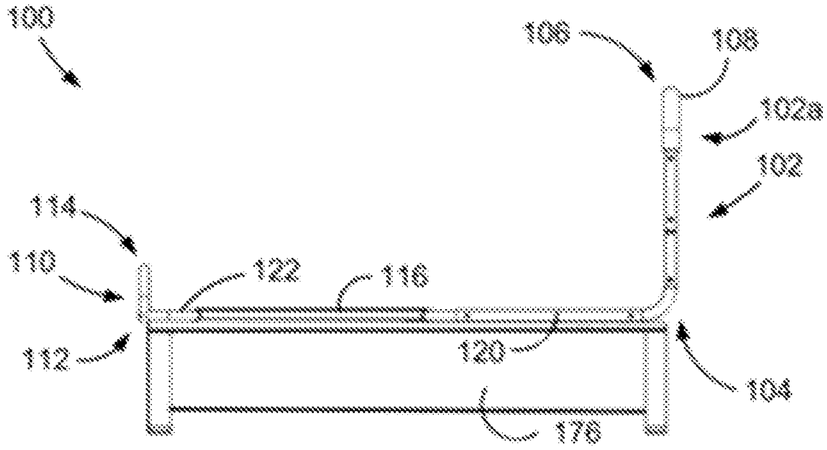
FIG. 14 is a front view of the bed rail assembly of FIG. 2 positioned on another bed base.

As exemplified in FIGS. 13 and 14 a bed rail assembly 100 may be positioned on the box spring and/or the bed base 176 wherein it extends across the box spring and/or bed base in a width-wise direction. The bed rail assembly 100 may then be secured in position using any anchor member discussed herein. Alternately, it may merely be positioned on the box spring, or the bed base if there is no box spring. In either event, once positioned, a mattress may be positioned therebetween wherein the length of the connecting members is adjusted before or after the mattress is positioned in place, depending upon the type of connecting member that is used. If the bed rail assembly 100 has a fixed length 124, then the bed rail assembly 100 may be assembled and the mattress positioned therebetween. If the bed rail assembly has a variable length, which is provided by using rigid members (e.g., extension members 146, see for example FIGS. 2-5), then the connecting member(s) 116 may be assembled to the desired length and the mattress positioned therebetween. Alternately, if the assembly has a variable length, which is provided by using flexible members, then the flexible member may be positioned and, if the flexible member is adjustable, the length is then adjusted (see for example FIGS. 6A-6E and 7A-7D) and the mattress is then positioned thereon. Alternately, if the tightening member (e.g., buckle or ratchet) is not under the mattress, then the mattress may be positioned, and the flexible connecting member tightened to abut the opposed sides of the mattress.

As discussed previously, the anchoring means, if any, that is selected may depend on the presence or absence of a box spring and type of bed base. For example, the bed rail assembly 100 in FIGS. 13 and 14 is positioned on a platform bed base 176. The bed rail assembly 100 may therefore be secured to the bed base 176 using anchor channels 186 (see FIG. 12A) and/or by first and second anchor members 160, 162 (see FIG. 8) passing under the bed base 176 similar to the example illustrated in FIG. 9A or 9B. The anchor members 160, 162 may be extensions of the connecting member(s) 116, may be separate from the connecting members, and/or may form additional connecting member(s).

Figure 15A:
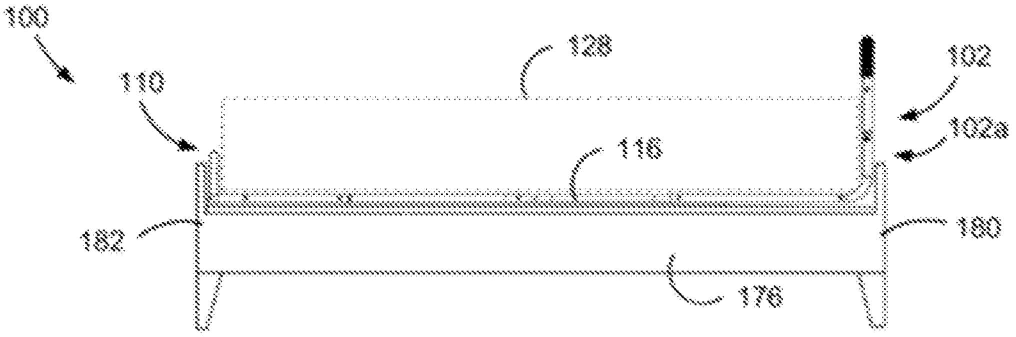
FIG. 15A is a front view of the bed rail assembly of FIG. 2 positioned on an alternate bed base.
Figure 15B:
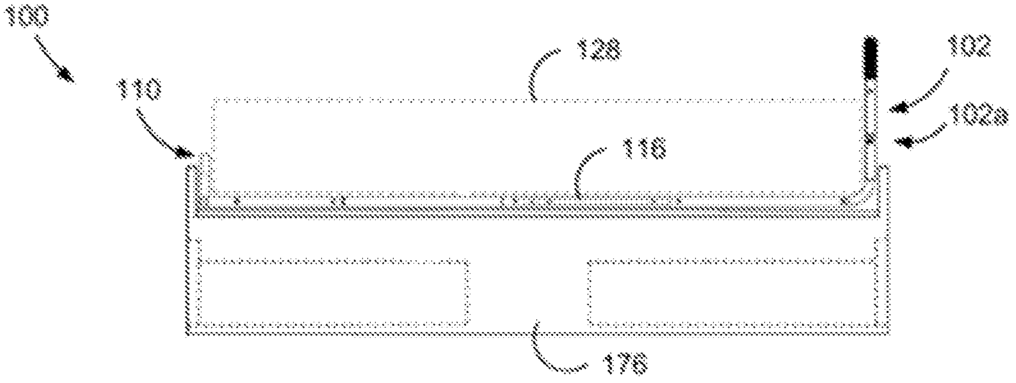
FIG. 15B is a front view of the bed rail assembly of FIG. 2 positioned on an alternate bed base; and, FIG. 15C is a front view of the bed rail assembly of FIG. 2 positioned on an alternate bed base.
Figure 15C:
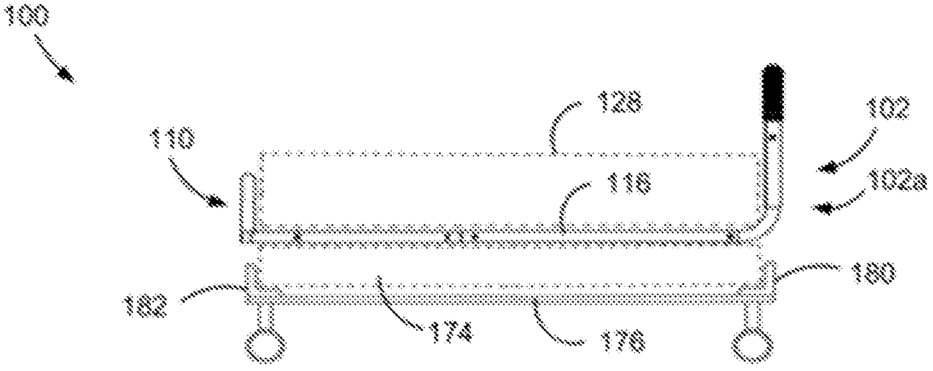

FIGS. 15A-15C exemplify anchor members which may be used depending upon the type of bed frame that is provided.

FIG. 15A exemplifies a traditional bed base having a plurality of slats spaced apart in the longitudinally extending direction of the bed base 176 and extending laterally between the first and second longitudinally extending bed base members 180, 182. The slats may not be suitable for use with channel anchors. It may therefore be chosen to secure the bed rail assembly 100 to the bed base 176 by first and second anchor members 160, 162 (see FIG. 9A) passing under the bed base 176 similar to the example illustrated in FIG. 9A. Alternately, or in addition, the bed rail assembly 100 may also be secured to the bed base 176 by using first and second anchor members (see FIG. 11A) passing through a gap between the slats to individually secure the rail portion 102*a* and the mattress securing member 110 to respective ones of the first and second longitudinally extending bed base members 180, 182 similar to the examples illustrated in FIGS. 11A and 11C.

FIG. 15B exemplifies an under-bed drawer type bed base. Since the bed base 176 extends to the ground surface around a perimeter of the bed base, it may therefore be chosen to secure the bed rail assembly 100 to the bed base 176 using anchor channels 186 (see FIG. 12A).

FIG. 15C exemplifies a metal frame having the box spring 174 positioned within the metal frame. The box spring may not be suitable for use with channel anchors. It may therefore be chosen to secure the bed rail assembly 100 to the box spring 174 by first and second anchor members 160, 162 (see FIG. 8) passing under the box spring 174. It may alternatively be chosen to secure the bed rail assembly 100 to the box spring 174 and the bed base 176 by first and second anchor members 160, 162 (see FIG. 8) passing under the box spring 174 and the bed base 176 similar to the example illustrated in FIG. 9A. As a further alternative, it may be chosen to secure the bed rail assembly 100 to the bed base 176 only by individually securing the rail portion 102*a* and the mattress securing member 110 to respective ones of the first and second longitudinally extending bed base members 180, 182 similar to the examples illustrated in FIGS. 11A and 11C.

While FIGS. 15A-15C show the user support member 102 as the rail portion, the same considerations may be applied in determining how to secure the bed rail assembly 100 to the box spring 174 and/or bed base 176 where the user support member 102 is the support pole 102*b*.

Optionally, the method may include adjusting the height 136 of the rail portion 102*a* to adjust the position of the hand grip portion 108 to a location above the top side 138 of the mattress 128.

Optionally, the method may include adjusting the height 136 of the support pole 102*b* to secure the position of the support pole 102*b* along one of the longitudinally extending side of the mattress between the floor and ceiling of the room within which the bed rail assembly is used.

Optionally, the method may include adjusting the height 140 of the upper end 114 of the mattress securing member 110 to a location below the top side 138 of the mattress 128.

Accordingly, the method steps may provide the portable bed rail for a user having the user support member and the mattress securing member positionally fixed with respect to each other by at least one connecting member such that the separation distance between the user support member and the mattress securing member may not independently increase (i.e., requires adjustment by the user, using tools, for example). The bed rail assembly may further be positionally fixed with respect to the box spring and/or bed base upon which it is positioned. The mattress of the user secured between the user support member and the mattress securing member may therefore also be positionally fixed relative to the box spring and/or bed base in at least the laterally extending direction.

Any members of the bed rail assembly that may be in contact with the mattress, such as the lower members and the connecting members, for example, may include a rubber or other friction-enhancing material on an outer surface thereof to provide additional resistance against the mattress shifting in any direction relative to the bed rail assembly. As provided by the method steps, the user support member may abut the first longitudinally extending side of the mattress and the mattress securing member may abut the second longitudinally extending side of the mattress such that the user support member may not separate from the first longitudinally extending side of the mattress. The method steps therefore may provide the portable bed rail for a user that may prevent the formation of life-threatening entrapment gaps between the user support member and the mattress.

While specific embodiments have been described and illustrated, such embodiment should be considered illustrative only and should not serve to limit the accompanying claims.

A number of variations may be made in the disclosed embodiment, all without departing from the scope of the invention, which is defined solely by the appended claims.

Clause Set A

1. A kit for a bed rail assembly comprising:
   (a) a user support member having a hand grip portion;
   (b) a mattress securing member having a lower end and an upper end; and,
   (c) a first connecting member comprising a longitudinally extending member which has a length that is at least as long as a width of a mattress and is operable to secure the mattress securing member a first fixed distance from the user support member, wherein, when the kit is assembled and provided on a bed frame, the first connecting member extends between the user support member and the lower end of the mattress securing member, and wherein, when the kit is assembled and provided on the bed frame, the first connecting member secures the mattress securing member spaced the first fixed distance from the user support member and facing the user support member with the upper end of the mattress securing member above the lower end of the mattress securing member.
2. The kit of clause 1 wherein the first connecting member is also operable to secure at least one of the user support member and the mattress securing member to the bed frame.
3. The kit of clause 1 wherein the length of the connecting member is adjustable.
4. The kit of clause 3 further comprising a locking member, wherein the mattress securing member is securable at a plurality of fixed distances from the user support member and the plurality of fixed distances correspond to standard widths of mattresses.
5. The kit of clause 1 wherein the first connecting member is a telescopically adjustable member that is securable in a plurality of positions, each of which defines a different length of the first connecting member whereby the mattress securing member is securable at a plurality of fixed distances from the user support member.
6. The kit of clause 1 wherein the first connecting member comprises a flexible member, and the length of the connecting member is adjustable.
7. The kit of clause 6 wherein the flexible member has a length sufficient to extend around the bed frame whereby, when the kit is assembled and provided on the bed frame, the mattress securing member is secured the first fixed distance from the user support member and the user support member and the mattress securing member are secured to the bed frame.
8. The kit of clause 1 wherein the user support member comprises a rail portion having a lower portion and an upper portion, the upper portion comprising the hand grip portion, the rail portion has a rail portion height from the lower end of the rail portion to the upper end of the rail portion and the rail portion height is adjustable and the hand grip portion is securable in a plurality of positions with respect the lower portion of the rail portion.
9. The kit of clause 1 wherein the mattress securing member has a mattress securing member height from the lower end of the mattress securing member to the upper end of the mattress securing member and the mattress securing member height is adjustable and the upper end of the mattress securing member is securable in a plurality of positions with respect the lower end of the mattress securing member.
10. The kit of clause 1 wherein the user support member comprises a support pole.

11. The kit of clause 1 wherein the user support member comprises a rail portion having a lower portion and an upper portion, the upper portion comprising the hand grip portion and the kit further comprises a second connecting member wherein each of the rail portion and the mattress securing member have first and second longitudinally spaced apart ends, the first connecting member secures the first end of the mattress securing member the first fixed distance from the first end of the rail portion and the second connecting member secures the second end of the mattress securing member the first fixed distance from the second end of the rail portion.

The invention claimed is:

1. A method of providing a portable bed rail for a user comprising the steps of:

a) positioning a user support member of a bed rail assembly on a first longitudinally extending side of a mattress, the mattress positioned on a bed frame, the user support member comprising a hand grip portion;

b) positioning a mattress securing member of the bed rail assembly on an opposed second longitudinally extending side of the mattress, the mattress securing member having a lower end and an upper end;

c) securing the bed rail assembly to the mattress by securing the user support member at a fixed distance from the mattress securing member with the user support member abutting the first longitudinally extending side of the mattress and the mattress securing member abutting the second longitudinally extending side of the mattress; and d) positionally fixing the bed rail assembly on the bed frame by i) wrapping a first flexible member that is connected to the user support member around a first portion of the bed frame, and ii) wrapping a second flexible member that is connected to the mattress securing member around a second portion of the bed frame.

2. The method of claim 1 wherein step (c) comprises positioning a first connecting member having a fixed length underneath the mattress and using the first connecting member to secure the user support member the fixed distance from the mattress securing member whereby each of the user support member and the mattress securing member abut an opposed side of the mattress.

3. The method of claim 2 wherein using the first connecting member to secure the user support member the fixed distance from the mattress securing member comprises securing the first connecting member to the lower end of the mattress securing member and a portion of the user support member located below an upper end of the mattress.

4. The method of claim 1 wherein step (c) comprises positioning a connecting member underneath the mattress wherein the connecting member comprises a telescopically adjustable member and using the connecting member to secure the user support member the fixed distance from the mattress securing member.

5. The method of claim 4 wherein the user support member comprises a rail portion having a lower portion and an upper portion, the upper portion comprising the hand grip portion, and using the connecting member to secure the user support member the fixed distance from the mattress securing member comprises securing the connecting member to the lower portion of the rail portion and the lower end of the mattress securing member.

6. The method of claim 1 wherein the user support member comprises a rail portion having a lower portion and an upper portion, the upper portion comprising the hand grip portion, each of the rail portion and the mattress securing member have first and second longitudinally spaced apart ends and step (c) comprises positioning a first connecting member underneath the mattress and using the first connecting member to secure the first end of the rail portion the fixed distance from the first end of the mattress securing member and positioning a second connecting member underneath the mattress and using the second connecting member to secure the second end of the rail portion the fixed distance from the second end of the mattress securing member.

7. The method of claim 1 wherein the user support member comprises a support pole and the method further comprises securing the support pole in position adjacent a side of the bed frame.

8. The method of claim 1 wherein step (d) further comprises:

iii) connecting the first flexible member to the second flexible member.

9. The method of claim 1 wherein the first portion of the bed frame comprises a first longitudinally extending bed base member and the second portion of the bed frame comprises a second longitudinally extending bed base member.

* * * * *